United States Patent
Doi et al.

(10) Patent No.: US 8,320,345 B2
(45) Date of Patent: Nov. 27, 2012

(54) RADIO COMMUNICATION METHOD AND RADIO COMMUNICATION DEVICE

(75) Inventors: Hiroshi Doi, Osaka (JP); Taisuke Matsumoto, Sunnyvale, CA (US); Suguru Fujita, Tokyo (JP); Masahiro Mimura, Tokyo (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 12/526,248

(22) PCT Filed: Feb. 5, 2008

(86) PCT No.: PCT/JP2008/000151
§ 371 (c)(1),
(2), (4) Date: Aug. 6, 2009

(87) PCT Pub. No.: WO2008/096537
PCT Pub. Date: Aug. 14, 2008

(65) Prior Publication Data
US 2010/0316043 A1   Dec. 16, 2010

(30) Foreign Application Priority Data
Feb. 6, 2007 (JP) .................. 2007-027409
Jan. 31, 2008 (JP) .................. 2008-022067

(51) Int. Cl.
*H04W 4/00* (2009.01)
*H04J 3/06* (2006.01)
(52) U.S. Cl. ...................... 370/338; 370/350
(58) Field of Classification Search .......... 370/338
See application file for complete search history.

(56) References Cited

U.S. PATENT DOCUMENTS
7,636,343 B2 * 12/2009 Mizukoshi .............. 370/338
(Continued)

FOREIGN PATENT DOCUMENTS
JP   10-135965   5/1998
(Continued)

OTHER PUBLICATIONS
International Search Report dated May 20, 2008.
(Continued)

*Primary Examiner* — Gary Mui
*Assistant Examiner* — Shaq Taha
(74) *Attorney, Agent, or Firm* — Dickinson Wright PLLC

(57) ABSTRACT

Provided is a radio communication method which can reduce the power consumption as compared to the conventional technique while realizing coexistence of a plurality of radio communication methods and can perform synchronization with a super frame of other radio communication device. The super frame has life confirmation slots (2820, 2830) through which radio communication devices of various modulation types should transmit tone signals. A radio communication device has a chance to judge whether one or more radio communication devices using a different modulation type exist or no such device exists in the vicinity. If no such device exists, the slot to be used by the radio communication device of the modulation method is reported as a time that can be used by a radio communication group of other modulation method. Thus, by confirming existence of an object in the vicinity by other radio communication device with which communication cannot be performed, communication can be performed by sharing the super frame.

6 Claims, 29 Drawing Sheets

U.S. PATENT DOCUMENTS

| | | |
|---|---|---|
| 2001/0021638 A1 | 9/2001 | Spratt |
| 2002/0071448 A1* | 6/2002 | Cervello et al. ............... 370/445 |
| 2005/0058151 A1* | 3/2005 | Yeh ............................... 370/445 |
| 2005/0089057 A1* | 4/2005 | Kang et al. .................... 370/445 |
| 2006/0030343 A1 | 2/2006 | Ebner |
| 2008/0101308 A1* | 5/2008 | Gaur .............................. 370/338 |
| 2008/0144493 A1* | 6/2008 | Yeh ............................... 370/230 |
| 2008/0212547 A1* | 9/2008 | Sugaya et al. ................. 370/338 |

FOREIGN PATENT DOCUMENTS

| | | |
|---|---|---|
| JP | 2001-298406 | 10/2001 |
| JP | 2006-504307 | 2/2006 |
| WO | 2007/066741 | 6/2007 |

OTHER PUBLICATIONS

Yunpeng Zang, et al. "Towards High Speed Wireless Personal Area Network—Efficiency Analysis of MBOA MAC," Department of Communication Networks, http://www.ctr.kcl.ac.uk/IWWAN2005/papers/88_invited_philips.pdf, RWTH Aachen University: May 2005, 10 pages total, p. 2 line 34.

* cited by examiner

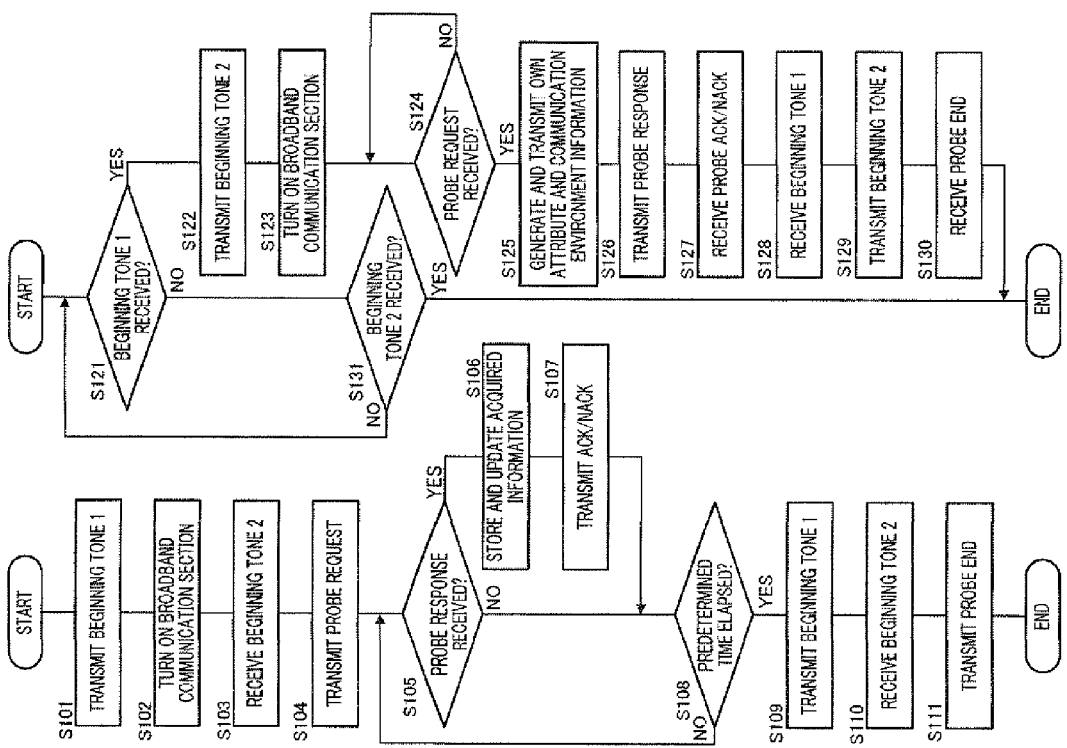

| | SEND/RECEIVE TONE (500 nsec) | BEGINNING TONE 1 (750 nsec) | BEGINNING TONE 2 (1500 nsec) | END TONE (3000 nsec) |
|---|---|---|---|---|
| PROBE SLOT (INITIAL SIGNAL) | IGNORE | TRANSMIT BEGINNING TONE 2 BROADBAND SYNCHRONIZATION | WAIT FOR ANOTHER BEGINNING TONE 2 | RE-SYNCHRONIZATION AT NEXT END TONE |
| PROBE SLOT (NOT INITIAL) NORMAL PROBE BEGINNING TONE 1 SENDER | TRANSMIT SEND/ RECEIVE TONE BROADBAND RECEPTION | IGNORE | IGNORE | RE-SYNCHRONIZATION AT NEXT END TONE |
| PROBE SLOT (NOT INITIAL) NORMAL PROBE BEGINNING TONE 1 RECEIVER | RECEIVE OPERATION PROBE RESPONSE | TRANSMIT BEGINNING TONE 2 BROADBAND RECEPTION SUBSEQUENT R/C-eS | IGNORE | RE-SYNCHRONIZATION AT NEXT END TONE |
| PROBE SLOT (NOT INITIAL) NORMAL PROBE BEGINNING TONE 2 RECEIVER | IGNORE | IGNORE | SUBSEQUENT RTS/ CTS-e SLOT | RE-SYNCHRONIZATION AT NEXT END TONE |
| TRANSMIT/RECEIVE SLOT | NORMAL RECEPTION (BROADBAND COMMUNICATION) | RE-SYNCHRONIZATION AT NEXT END TONE PROBE SLOT TIME | RE-SYNCHRONIZATION AT NEXT END TONE | RE-SYNCHRONIZATION AT NEXT END TONE |

FIG.14

| | SEND/RECEIVE TONE (500 nsec) | BEGINNING TONE 1 (750 nsec) | BEGINNING TONE 2 (1500 nsec) | END TONE (3000 nsec) |
|---|---|---|---|---|
| PROBE SLOT (NOT INITIAL) 6-DIRECTION PROBE BEGINNING TONE 1 SENDER | NORMAL RECEPTION | IGNORE | IGNORE | RE-SYNCHRONIZATION AT NEXT END TONE |
| PROBE SLOT (NOT INITIAL) 6-DIRECTION PROBE BEGINNING TONE 1 RECEIVER | NORMAL RECEPTION PROBE RESPONSE TRANSMISSION IF NO DATA | TRANSMIT BEGINNING TONE 2 R/C-eS AFTER NORMAL RECEPTION | RTS/CTS-e SLOT AFTER PROBE SLOT TIME WAIT | RE-SYNCHRONIZATION AT NEXT END TONE |
| PROBE SLOT (NOT INITIAL) 6-DIRECTION PROBE BEGINNING TONE 2 RECEIVER | IGNORE | IGNORE | SUBSEQUENT RTS/ CTS-e SLOT | RE-SYNCHRONIZATION AT NEXT END TONE |
| END TONE SLOT BEFORE END TONE RECEPTION | IGNORE | IGNORE | IGNORE | END TONE SYNCHRONIZATION (END TONE TRANSMISSION) |
| END TONE SLOT AFTER END TONE RECEPTION | IGNORE | IGNORE | IGNORE | END TONE RESYNCHRONIZATION (END TONE TRANSMISSION) |

FIG.15

| TOC | TITLE | ARTIST | TRACK | SHADOW | CODEC |
|---|---|---|---|---|---|
| | | | MEDIA | TIME LIMIT | RATE |
| xxx.yyy | TITLE 1 | ARTIST 1 | 2 | ON | Mp3 |
| | | | ON | ∞ | 128k |
| aaa.ab | TITLE 2 | ARTIST 2 | 5 | ON | AAC |
| | | | OFF | 45Ds | 128k |
| 111.22 | TITLE 3 | ARTIST 3 | 11 | OFF | Mp3 |
| | | | ON | 23Ds | 128k |
| | | | | | |
| | | | | | |

1901 TOC, 1902 TITLE, 1903 ARTIST, 1905 TRACK, 1904 MEDIA, 1907 SHADOW, 1906 TIME LIMIT, 1908 CODEC/RATE

FIG.22

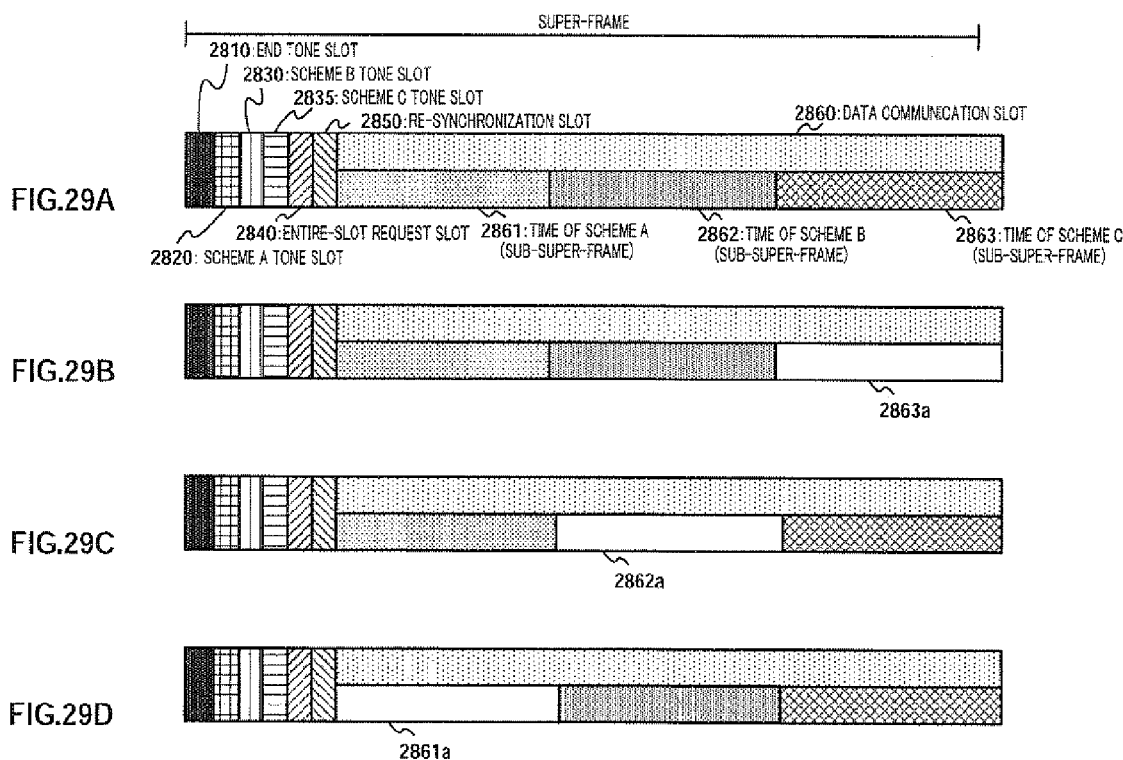

RADIO COMMUNICATION METHOD AND RADIO COMMUNICATION DEVICE

TECHNICAL FIELD

The present invention relates to a radio communication network, and more particularly to ad hoc network communication in a mobile environment.

BACKGROUND ART

In recent years, various proposals have been made concerning UWB (Ultra Wide Band) radio communication methods. As UWB radio communication enables broadband communication exceeding 1 Gbps, its application to video transmission and the like with large transmission capacity has been investigated. On the other hand, UWB cannot be said to be easy to use in an office environment due to the narrowness of its possible communication range, and it can be said to be better suited to PANs (Personal Area Networks) that are attracting attention nowadays. However, PANs are still in their early days, and there are very few major applications. Since PANs have the broadband characteristics, a device utilizing PANs generally uses a lot of power, but in the case of a PAN, movement is difficult while carrying a large number of batteries.

One application that uses a PAN and requires the broadband characteristics of UWB is a file exchange (file-swapping, file-sharing) application. The basic operating principle of a file exchange application is disclosed in Patent Document 1, for example. It is possible to create a mini-community with random file exchange in a mobile environment (referred to as message exchange in Patent Document 1). Although not mentioned in Patent Document 1, exchanged data is not limited to text documents, and the exchange of music, image, video, and suchlike files is also possible. With UWB in particular, since the effective transmission speed is 100 Mbps to several Gbps, people can exchange large files that bypass each other, and this kind of file exchange can be said to be an application suited to UWB.

Various discussions concerning transmitting schemes used in this UWB have emerged in IEEE802.15. There are many cases in which a MAC protocol implemented in a PAN (and more particularly, a mobile PAN) environment is a scheme using autonomous distributed processing. This is because, in a PAN environment in which terminals constantly pass by each other, constructing a master-slave relationship each time, and starting communication after setting up a communication environment, such as assigning data slots, is a major overhead.

Further, the standardization of a radio communication apparatus in millimeter wave UWB is currently proceeded. In this regard, a plurality of radio communication schemes are proposed and argued. However, it is difficult to determine one scheme because these proposed schemes each have unique features. For example, ASK (Amplitude Shift Keying), PSK (Phase Shift Keying), and so on, are proposed for the modulation scheme. ASK can be implemented with a simple configuration, which can be manufactured extremely compact. On the other hand, PSK enables a faster transmission speed than ASK, yet involves a rather large apparatus configuration for ASK. To standardize these modulation schemes, a compartmentalization scheme in the same frequency band is required.

Non-Patent Document 1 discloses a radio communication scheme in an autonomous distribution type PAN.

FIG. 1 is a drawing showing the configuration of a super-frame in TDMA (Time Division Multiple Access).

In FIG. 1, a super-frame is divided into a beacon period 2201 and a data period 2202.

Beacons 2203 are transmitted from radio communication apparatuses within beacon period 2201, and it is guaranteed that beacons of neighboring nodes propagate to neighboring nodes without colliding.

Data period 2202 is divided equally per slot 2204, and slot IDs are assigned in that order, but this is not a limitation, and data periods may be unequal, and need not be contiguous.

Patent Document 1: Japanese Patent Application Laid-Open No. 2001-298406

Non-Patent Document 1: "Towards High Speed Wireless Personal Area Network-Efficiency Analysis of MBOA MAC", Yunpeng Zang, et al.

DISCLOSURE OF INVENTION

Problems to be Solved by the Invention

However, in the case of the radio communication scheme described in Non-Patent Document 1, if there are mixed super-frame groups that are formed with a plurality of radio communication apparatuses and that share a beacon period in the same space, data slot and beacon period collisions may occur.

One possible method of solving this problem is for all nodes belonging to a super-frame group to constantly detect super-frame group collisions, and to compose an algorithm that adapts to this in a distributed fashion.

However, with the above-described method, it is necessary for a radio communication apparatus to keep its beacon receiving section in a reception wait (standby) state at all times, and requires large reception standby power. This is a major demerit in an environment in which power can only be expected to be supplied by a battery, as in the case of a mobile communication apparatus.

Also, since a radio communication apparatus must constantly emit a beacon regardless of whether or not there are other radio communication apparatuses in vicinities, power consumption is further increased.

If the above-described scheme is simply adopted, the division ratio of a super-frame is always constant, and, regardless of whether or not there are radio communication apparatuses of other schemes in the vicinity, a certain slot duration is consumed as an inactive duration without performing communication.

In view of the above, it is therefore an object of the present invention to provide a radio communication method and radio communication apparatus that realize a coexistence of a plurality of radio communication schemes and enable power consumption to be reduced as compared with a conventional scheme, and a super-frame to be synchronized with the super-frame of other radio communication apparatus, in an ad hoc network.

Means for Solving the Problems

The radio communication method of the present invention, which finds synchronization between radio communication apparatus groups using different radio communication schemes from each other while performing ad hoc network communication between radio communication apparatuses using a same radio communication scheme, includes the steps of: in the radio communication apparatus groups, finding synchronization by an end tone for identifying an end of a super-frame; and in radio communication apparatuses that belong to the radio communication apparatus groups, transmitting a tone signal for reporting an existence of the radio communication apparatus groups, and in which the tone signal is transmitted in an existence confirmation slot per radio communication scheme provided in the super-frame, and used to determine a slot that is assigned to the radio communication apparatus groups that use the radio communication schemes in the super-frame.

The radio communication apparatus of the present invention, which finds synchronization with another radio communication apparatus group using different radio communication schemes from each other while performing ad hoc network communication with another radio communication apparatus using a same radio communication scheme, the apparatus comprising: a synchronizing section that finds synchronization by an end tone for identifying an end of a super-frame; and a tone signal transmitting section that transmits a tone signal to report an existence of a radio communication apparatus group to which the apparatus belongs, and in which the tone signal is transmitted in the super-frame per radio communication scheme provided in an existence confirmation slot, and used to determine a slot that is assigned to the radio communication apparatus groups that use the radio communication schemes in the super-frame.

Accordingly, the radio communication apparatus of the present invention decides whether there is at least one radio communication apparatus that uses a different modulation scheme or there is no such a radio communication apparatus in the vicinity, by providing an existence confirmation slot whereby the radio communication apparatus must transmit a tone signal. By providing such a chance, when there is no radio communication apparatus using a different modulation scheme in the vicinity, a slot that should be used in a radio communication apparatus of the modulation scheme can be reported as a time that can be used by a radio communication group of another scheme. By this means, by checking the existence of neighboring radio communication apparatuses using one radio communication apparatus that cannot communicate with the other radio communication apparatus, it is possible to perform communication while sharing a super-frame with each other.

Advantageous Effects of the Invention

According to the present invention, in an ad hoc network, a radio communication apparatus can reduce standby power consumption as compared with a conventional case, and super-frame synchronization adjustment becomes possible in a mobile environment. As a result, communication with another radio communication apparatus can be started in a minimal time.

Further, according to the present invention, it is possible to realize the coexistence of two or more radio communication schemes.

BRIEF DESCRIPTION OF DRAWINGS

FIG. 11A is a flowchart explaining probe processing of a request-side radio communication apparatus according to Embodiment 1 of the present invention, and FIG. 11B is a flowchart explaining probe processing of a response-side radio communication apparatus according to Embodiment 1 of the present invention;

FIG. 14 is a drawing showing operations when a radio communication apparatus according to Embodiment 1 of the present invention receives a tone signal;

FIG. 15 is a drawing showing operations when a radio communication apparatus according to Embodiment 1 of the present invention receives a tone signal;

FIG. 22 is a drawing showing the configuration of a music software file list managed by a mobile file exchange apparatus according to Embodiment 4 of the present invention;

FIG. 29A is a drawing of a super-frame at coexistence of three schemes according to Embodiment 8 of the present invention, FIG. 29B is a drawing explaining a reuse method for a sub-super-frame of scheme C in the case of non-existence of scheme C, FIG. 29C is a drawing explaining a reuse method for a sub-super-frame of scheme B in the case of non-existence of scheme B, and FIG. 29D is a drawing explaining a reuse method for a sub-super-frame of scheme A in the case of non-existence of scheme A.

BEST MODE FOR CARRYING OUT THE INVENTION

Embodiments of the present invention will now be described with reference to the accompanying drawings. In the following embodiments, radio communication apparatuses are assumed to perform data communication procedures by means of UWB. Further, these embodiments do not limit the band for UWB but enables an arbitrary band to be used for UWB such as millimeter waves and microwaves.

Embodiment 1

Figure 1:
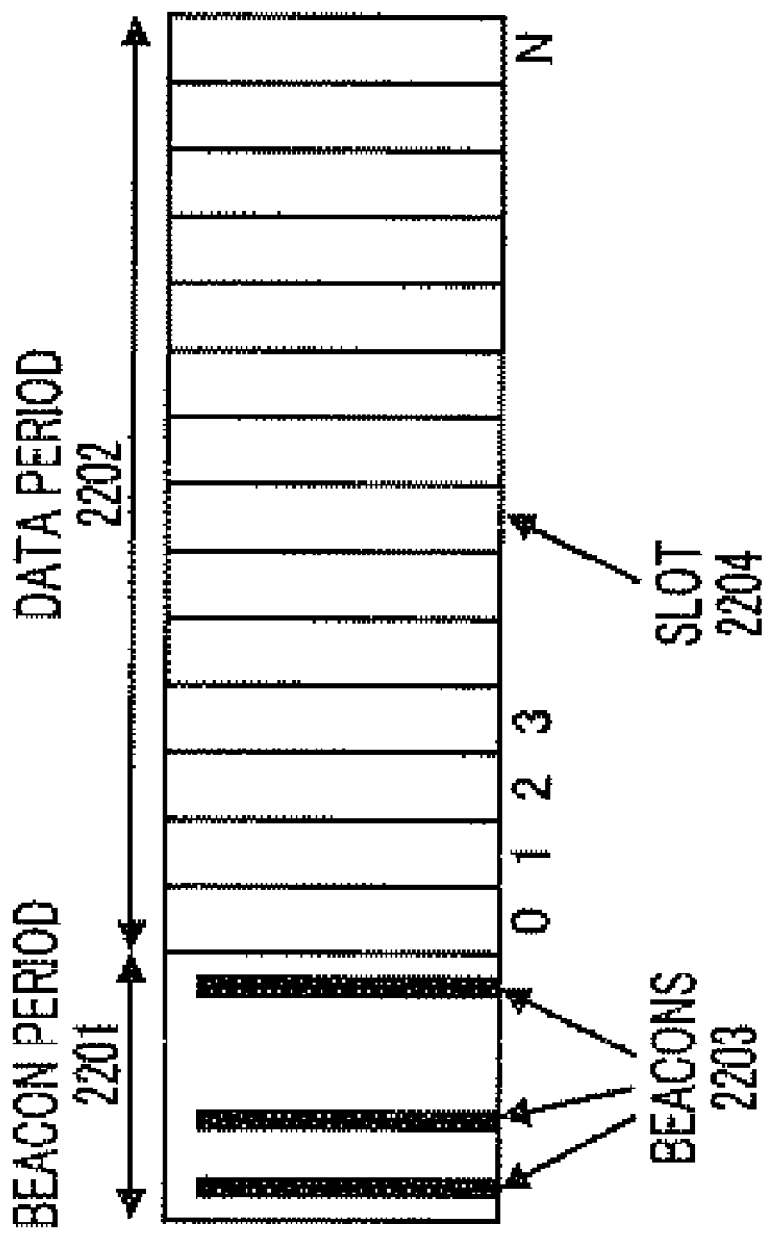
FIG. 1 is a drawing showing the configuration of a TDMA super-frame in a conventional radio communication method.
Figure 2:
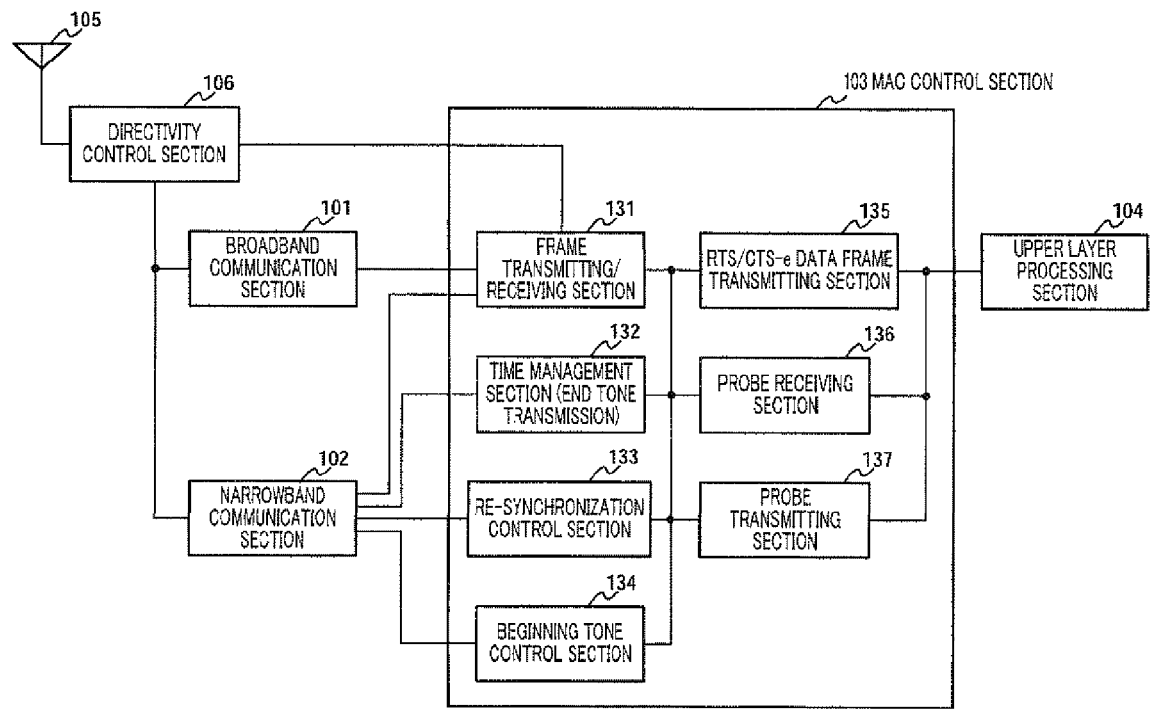
FIG. 2 is a drawing showing the configuration of a radio communication apparatus according to Embodiment 1 of the present invention.

FIG. 2 is a configuration diagram of a radio communication apparatus according to this embodiment of the present invention.

In FIG. 2, the radio communication apparatus is equipped with an antenna 105, a directivity control section 106, a broadband communication section 101, a narrowband communication section 102, a MAC control section 103, and an upper-order layer processing section 104.

Antenna 105 comprises a plurality of directional antennas each responsible for a particular sector, and directivity control section 106 controls the directional antennas composing antenna 105 and determines the communication range. Broadband communication section 101 transmits and receives UWB signals, and narrowband communication section 102 transmits and receives narrowband signals with or without performing modulation. If a broadband signal is DS-UWB (Direct Sequence UWB), the respective transmitters may be shared, so as to widen the transmitted DS-UWB pulse width in order to transmit a narrowband signal.

Upper-order layer processing section 104 executes various kinds of applications, generates transmit data such as content data and sends this to MAC control section 103, and also receives reception data from MAC control section 103 and performs application processing.

MAC control section 103 performs MAC protocol processing, and has a frame transmitting/receiving section 131, a time management section 132, a re-synchronization control section 133, a beginning tone control section 134, an RTS/CTS-e data frame transmitting section 135, a probe receiving section 136, and a probe transmitting section 137.

Frame transmitting/receiving section 131 transmits and receives a send/receive tone giving notification of data communication, and transmits/receives a subsequent frame by means of a wideband signal using an RTS/CTS (Ready to Send/Clear to Send) extended scheme (RTS/CTS-e scheme) described later herein.

Time management section 132 manages time from the start time of a super-frame, and measures the transmission time of an end tone that gives notification of the end of its own super-frame, and also performs timing exchange with narrowband communication section 102 in order to perform synchronization with the end tone of another node (such as a radio communication apparatus).

Re-synchronization control section 133 transmits a re-synchronization signal via narrowband communication section 102 in order to synchronize with another super-frame group. Also, re-synchronization control section 133 monitors end tones over the entire super-frame range, and reports the timing of synchronization with another super-frame to time management section 132.

Beginning tone control section 134 transmits or receives a beginning tone 1 or beginning tone 2 for avoiding a data communication collision in accordance with a CSMA/CA (Carrier Sense Multiple Access with Collision Avoidance) procedure with a tone as a carrier.

RTS/CTS-e data frame transmitting section 135 generates a frame for transmitting data received from upper-order layer processing section 104, and sends this to frame transmitting/receiving section 131. RTS/CTS-e data frame transmitting section 135 also generates an RTS command of the RTS/CTS extended scheme (RTS/CTS-e scheme) described later herein, and sends this to frame transmitting/receiving section 131.

Probe receiving section 136 receives a probe request from another radio communication apparatus, generates information such as its own attributes and communication environment, and responds to the requesting node. This probe request asks the request destination for information such as the attributes and communication environment of that node.

Probe transmitting section 137 generates a probe request for requesting information such as the attributes and communication environment of a peripheral node, and transmits this to a peripheral node.

Also, on receiving a probe response from a probe request destination node, probe transmitting section 137 transmits "probe end" as a response.

Various kinds of signals and frames according to the present invention will now be described. First, a definition of a tone signal will be given. Here, a tone signal denotes an electrical signal that is identified by continuous transmission for a determined time without regard to narrowband signal modulation/non-modulation. The configuration closely resembles a busy tone used to convey to a peripheral node a state in which a signal is being emitted, such as in BTMA (Busy-Tone Multiple Access) or DBTMA (Dual Busy-Tone Multiple Access), for example.

Figure 3:
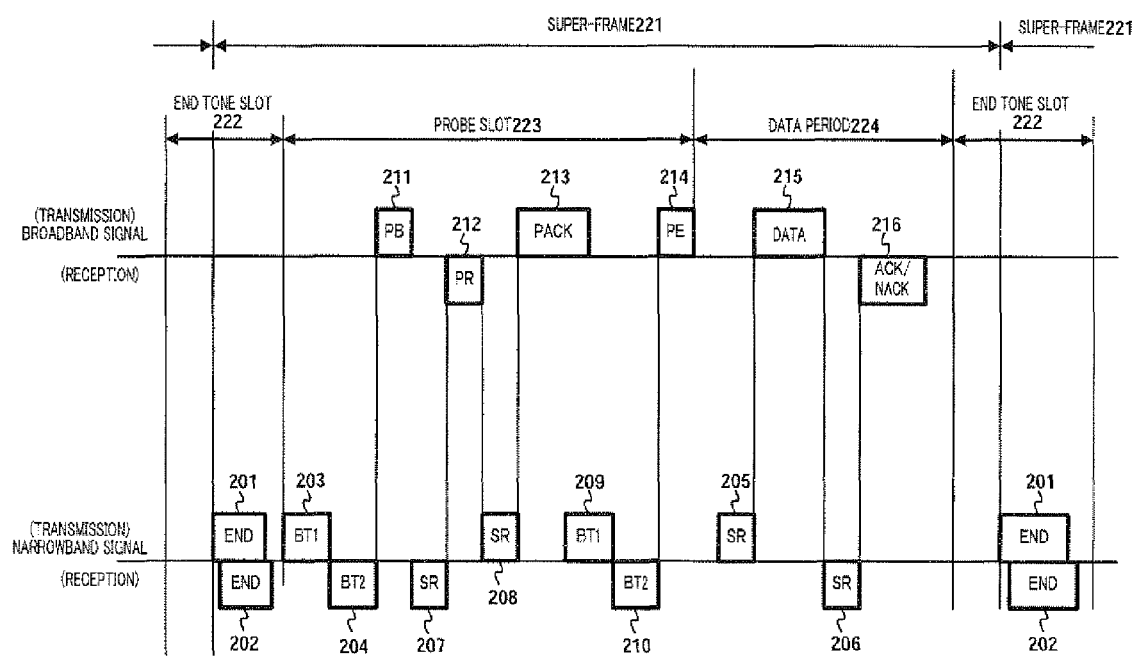
FIG. 3 is a timing chart showing a tone signal and frame transmission/reception protocol according to Embodiment 1 of the present invention.

FIG. 3 is a timing chart showing a transmission/reception protocol for this tone signal and frame.

In FIG. 3, a super-frame 221 is divided into end tone slots 222, a probe slot 223, and a data period 224.

An end tone slot 222 is a period in which end tones (END) 201 and 202 are transmitted and received. Probe slot 223 is a period in which beginning tone 1 (BT1) 203, beginning tone 2 (BT2) 204, probe request (PB) 211, probe response (PR) 212, acknowledge (PACK) 213, and probe end (PE) 214, are transmitted and received. Data period 224 is a period in which send/receive tones (SR) 205 and 206, data 215, and ACK/NACK 216, are transmitted and received.

Figure 4:
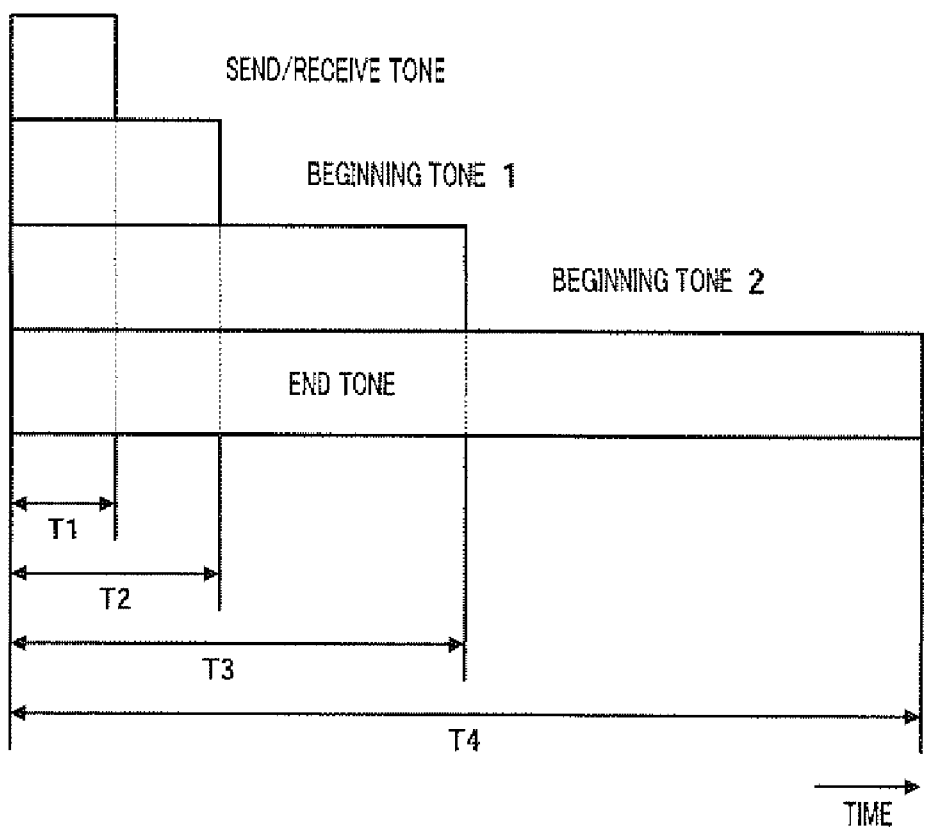
FIG. 4 is a drawing showing the length of each tone signal according to Embodiment 1 of the present invention.

FIG. 4 is a drawing showing the length of each tone signal. That is to say, duration T2 of beginning tone 1 is twice the length of tone duration T1 of send/receive, duration T3 of beginning tone 2 is twice the length of duration T2 of beginning tone 1, and duration T4 of the end tone is twice the length of duration T3 of beginning tone 2. Duration T3 of Beginning tone 2 must be no more than half the length of duration T4 of the end tone, but apart from this, the above ratios need not be maintained, and it is only necessary for the relative size relationships to be maintained. This is because even if two or more beginning tones 2 are detected, detection as beginning tone 2 is necessary. The occurrence of three or more beginning tones 2 in series, resulting in a multiple of two or more, is judged to be extremely rare.

For example, when a send/receive tone is stipulated as being 10 microseconds in length, on receiving a tone signal, narrowband communication section 102 determines a tone signal whose duration is less than 10 microseconds to be a send/receive tone. Narrowband communication section 102 determines a tone signal from 10 microseconds to the beginning tone 1 duration to be beginning tone 1. Furthermore, narrowband communication section 102 determines a tone signal from the beginning tone 1 duration to the beginning tone 2 duration to be beginning tone 2, and determines a tone signal of greater duration to be an end tone.

The operation and action of a radio communication apparatus configured as described above will now be explained.

First, super-frame synchronization processing will be described.

Figure 5:
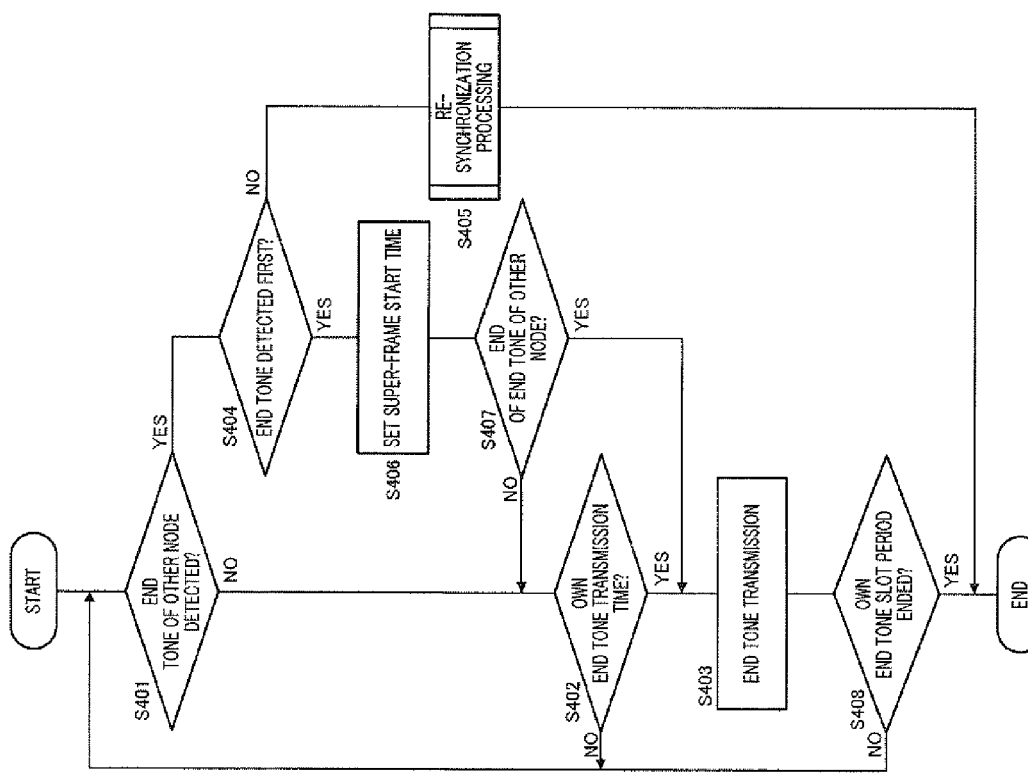
FIG. 5 is a flowchart explaining super-frame synchronization processing according to Embodiment 1 of the present invention.

FIG. 5 is a flowchart explaining super-frame synchronization processing.

In FIG. 5, first, if there is no notification of detection of an end tone of another node from narrowband communication section 102 (step S401), time management section 132 checks whether or not it is time to transmit the apparatus's own end tone (step S402).

If it is not time to transmit the apparatus's own end tone, the processing flow returns to step S401, whereas if it is time to transmit, time management section 132 directs narrowband communication section 102 to transmit the apparatus's own end tone. Narrowband communication section 102 receives this directive, transmits an end tone (step S403), and proceeds to the processing in step S408 described later herein.

On the other hand, if narrowband communication section 102 detects an end tone from another node, narrowband communication section 102 notifies time management section 132. Time management section 132 checks whether or not the present end tone detection was prior to the apparatus's own end tone output, and was reported first in the current end tone slot (step S404). Then, if the end tone is not first, time management section 132 performs re-synchronization processing described later herein (step S405) and terminates the processing.

On the other hand, if the end tone was reported first, time management section 132 sets the start time of super-frame synchronization managed by itself to the current time (step S406).

Next, time management section 132 checks whether or not the notification from narrowband communication section 102 reports the end of an end tone from another node (step S407).

If this is not the end of an end tone, narrowband communication section 102 returns to step S402, whereas if this is the end, narrowband communication section 102 proceeds to step S403 and performs processing to transmit the apparatus's own end tone (step S403). After the end of end tone transmission, time management section 132 checks whether or not its own end tone slot period has ended (step S408). If its own end tone slot period has ended, processing is terminated. If its own end tone slot period has not ended, the processing flow returns to step S401.

Thus, time management section 132 transmits end tone 201 when time management section 132 measures the end tone output time, but, if time management section 132 detects end tone 202 transmitted from another node within the end tone slot 222 range, measures the time difference from own end tone 201. Then time management section 132 sets its own super-frame end time to the start time of end tone 202 detected earlier than its own.

With regard to time management section 132, peripheral nodes also transmit an end tone within the same end tone slot 222, but all nodes set their own end tone start times to the end tone transmission start time of the node that transmits the earliest end tone among these. If the apparatus's own end tone transmission start time arrives during reception of the earliest end tone transmitted from another node, an end tone is transmitted, but if end tone reception is completed before the apparatus's own end tone transmission start time, the apparatus's own end tone is transmitted at that point in time.

By this means, it is possible for each node to synchronize with the earliest end tone in a super-frame.

Then, based on the start time of this synchronized super-frame 221, time management section 132 measures the timing of probe slot 223 and a data slot within data period 224. Assuming that a super-frame is defined as 64 milliseconds, and the length of end tone slot 222 as 512 microseconds, time management section 132 transmits an end tone after the elapse of 256 microseconds, which is the midway point of end tone slot 222. This is to allow accommodation in end tone slot 222 of another radio communication apparatus even if the end tone start time of this apparatus varies.

This super-frame synchronization operation will now be described using an actual example.

Figure 6:
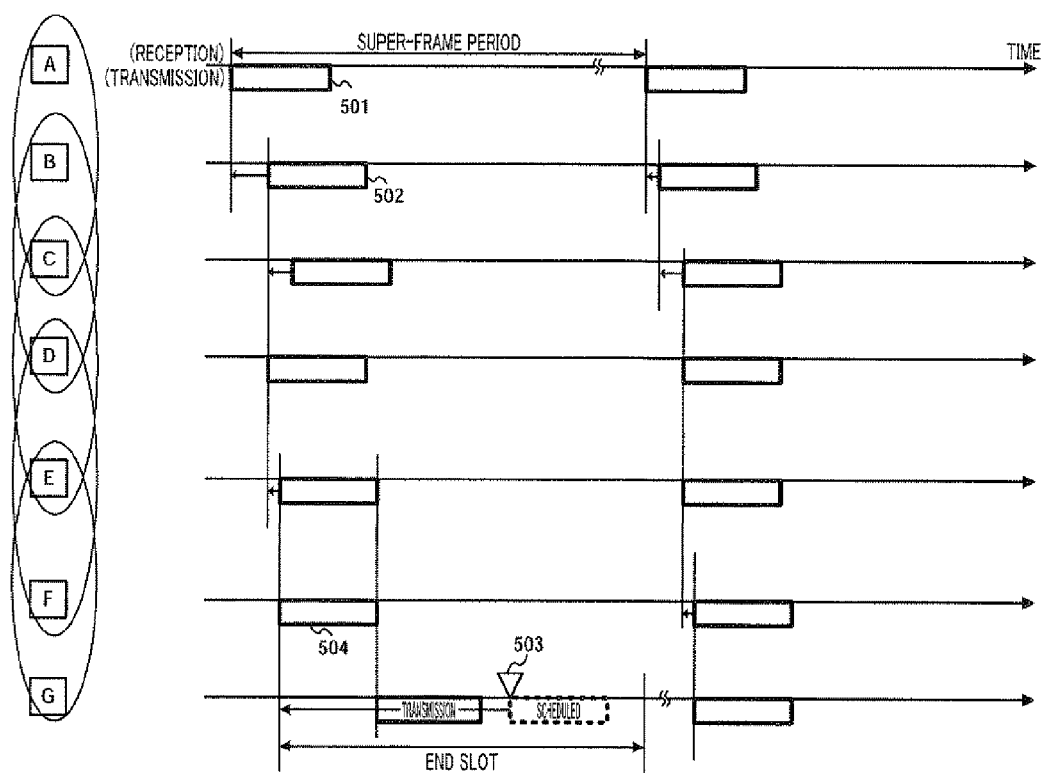
FIG. 6 is a drawing showing a super-frame synchronization operation according to Embodiment 1 of the present invention.

FIG. 6 is a drawing showing the operation whereby each radio communication apparatus of the same super-frame group synchronizes a super-frame period. The ellipses in the drawing indicate the communication capability areas of the radio communication apparatuses. Radio communication apparatus A through radio communication apparatus G are assumed to be mutually contiguous as shown in the drawing. In FIG. 6, an upper signal of each radio communication apparatus indicates reception, and a lower signal indicates transmission.

In FIG. 6, radio communication apparatus B performs transmission of an end tone 502 at end tone sending timing of a super-frame period, but detects an end tone 501 of radio communication apparatus A before transmission of its own end tone 502, and therefore sets its own measured super-frame period start timing to super-frame period start timing 501 of radio communication apparatus A. Similarly, radio communication apparatus C synchronizes its own super-frame start time with end tone 502 of radio communication apparatus B. By this means, the delay times of radio communication apparatus 13 and radio communication apparatus C are gradually converged to the delay times specific to their own super-frame periods.

Synchronization processing is also performed in a similar way for radio communication apparatuses D through F, synchronization being performed with the super-frame of the radio communication apparatus that transmits an end tone earliest within its own communication capability area.

End tone transmission time 503 of radio communication apparatus G is after the transmission of end tone 504 of radio communication apparatus F, and therefore the end tone of radio communication apparatus G is transmitted from the time at which radio communication apparatus F completes transmission of end tone 504. Then, in the next super-frame, radio communication apparatus G catches up with the super-frame start timing of the other radio communication apparatuses.

A description will now be given of super-frame re-synchronization processing in the case of mixing with another super-frame group.

In this super-frame re-synchronization processing, a radio communication apparatus performs end tone detection for super-frames as a whole, and when an end tone of another super-frame group is detected, synchronizes with a super-frame of another super-frame group that transmitted an end tone earliest.

Figure 7:
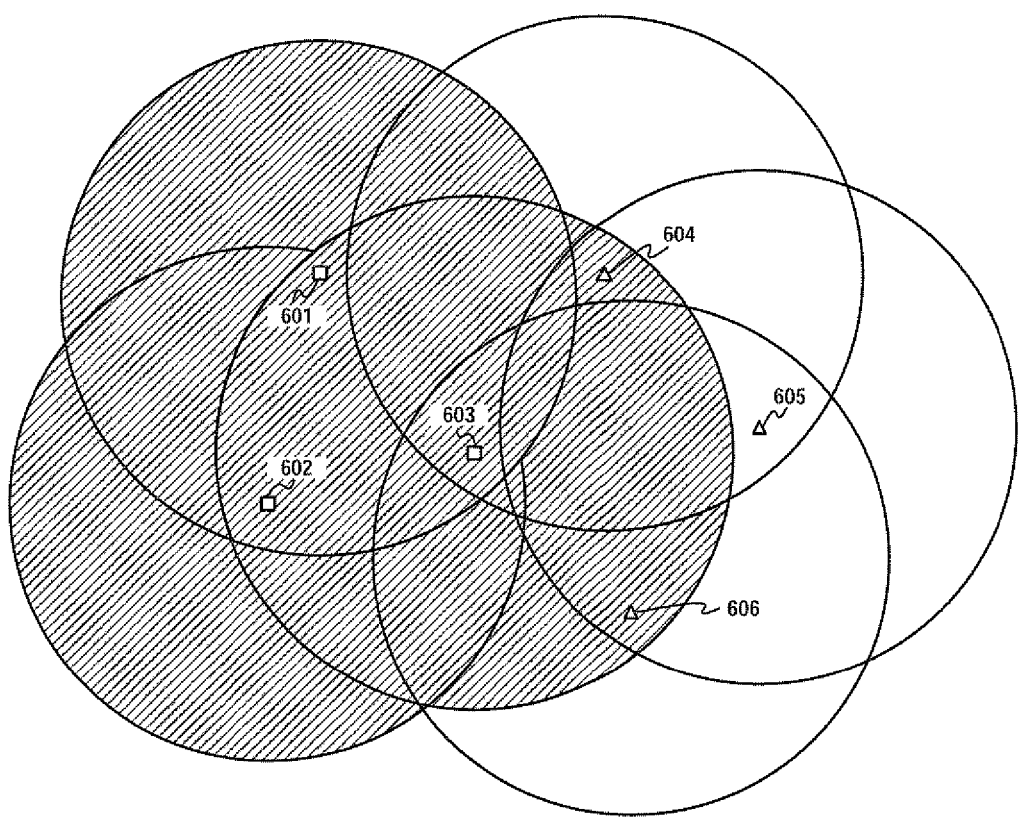
FIG. 7 is a drawing showing the arrangement of two super-frame groups according to Embodiment 1 of the present invention.

FIG. 7 is a drawing showing a case in which radio communication apparatuses 601 through 603 compose a super-frame group, and radio communication apparatuses 604 through 606 compose a separate super-frame group. In FIG. 7, radio communication apparatus 604 and radio communication apparatus 606 are within the communication capability area of radio communication apparatus 603.

If radio communication apparatus 603 detects an end tone of another super-frame group outside an end tone slot at such a time, radio communication apparatus 603 and radio communication apparatuses of the same super-frame group perform re-synchronization processing taking that as the starting point, and, ultimately, radio communication apparatuses 601 through 606 come to share the same super-frame.

Figure 8:
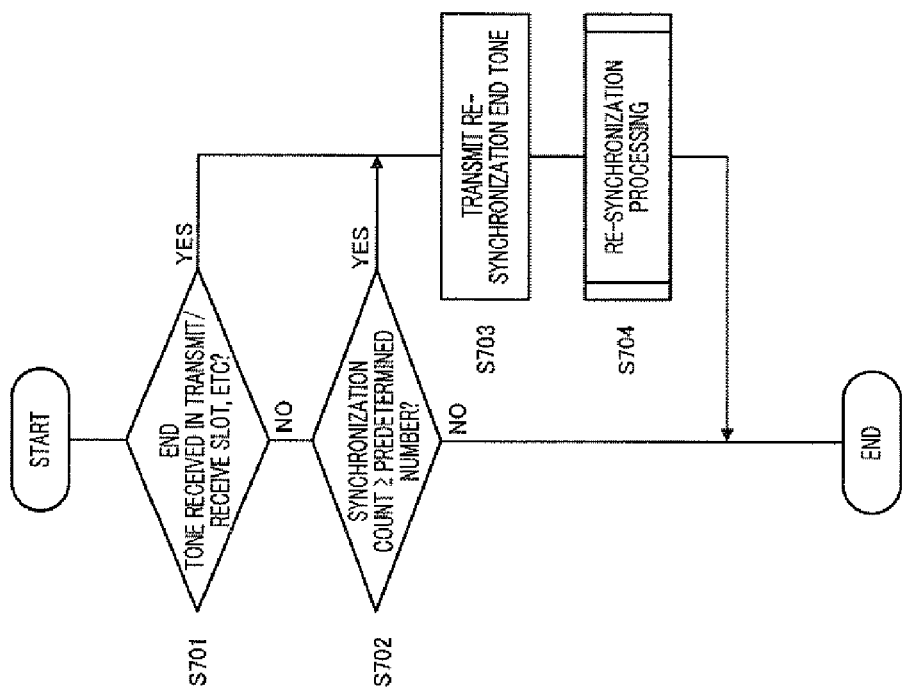
FIG. 8 is a flowchart explaining super-frame re-synchronization processing according to Embodiment 1 of the present invention.

FIG. 8 is a flowchart that determines whether or not super-frame re-synchronization processing is started at the end of end tone transmission/reception.

In FIG. 8, re-synchronization control section 133 checks whether or not the apparatus has received an end tone in a transmit/receive slot or the like in a super-frame period (step S701). If an end tone has been received, re-synchronization control section 133 checks whether or not this is a node for which the super-frame synchronization count since the apparatus finished the previous re-synchronization processing is greater than or equal to a predetermined number (designated count N), and re-synchronization is to be performed (step S702). If this synchronization count is large, the number of times reception is awaited for the entire super-frame is reduced accordingly, which enables power consumption to be reduced, but the start of communication with another group is delayed.

Generally, a synchronization count giving a rate of around once per second is desirable. Then, if this condition is met, re-synchronization control section 133 transmits a re-synchronization end tone regardless of another node (step S703). This re-synchronization end tone is an end tone transmitted again when 10-plus microseconds have elapsed from the end of the apparatus's own super-frame group end tone transmission, and notifies another node of the start of re-synchronization processing. Following this, re-synchronization control section 133 performs re-synchronization processing (step S704). Here, re-synchronization processing is processing that performs reception of end tones to be synchronized across super-frames as a whole. A node that receives this re-synchronization end tone but whose super-frame synchronization count has not reached predetermined count N resets the super-frame count, relays the re-synchronization end tone, and enters a re-synchronization state.

If, in step S701, the apparatus has received an end tone of another super-frame group in a super-frame, re-synchronization control section 133 transmits a re-synchronization end tone (step S703). Then, in order to synchronize speedily, re-synchronization processing is initiated (step S704). In the above example, the wait time until a re-synchronization end tone is transmitted is 10-plus microseconds, but this depends on the length of the end tone. Normally, nodes of the same super-frame group do not transmit an end tone in a time period three times the length of the end tone or more, and therefore a super-frame should be transmitted after a gap of around this triple time period. However, if the distance is too great, there is a possibility of an end tone of a different super-frame group being erroneously mixed with the re-synchronization end tone, and therefore this point must also be taken into consideration.

Figure 9:
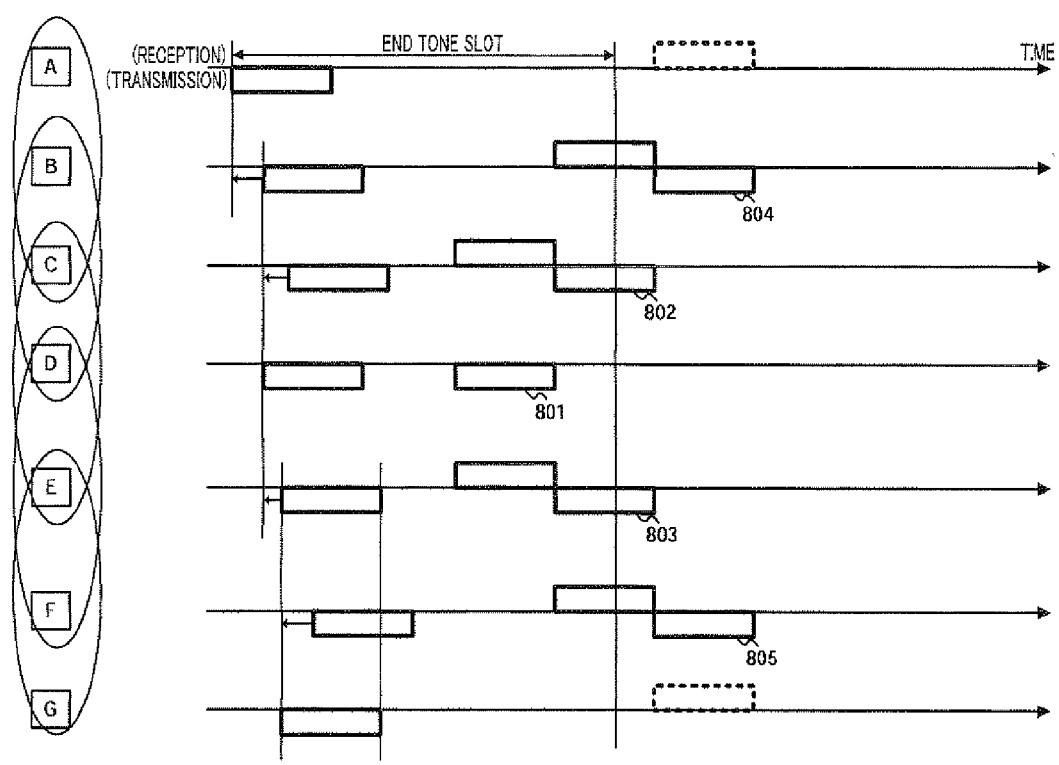
FIG. 9 is a drawing showing a re-synchronization end tone transmission/reception operation of a radio communication apparatus according to Embodiment 1 of the present invention.

FIG. 9 is a drawing showing an operation whereby a radio communication apparatus that has detected another super-frame group performs re-synchronization end tone transmission/reception. As in FIG. 6, radio communication apparatus A through radio communication apparatus G are contiguous as shown in FIG. 9. In FIG. 9, an upper signal of each radio communication apparatus indicates reception, and a lower signal indicates transmission. Here, radio communication apparatus D detects the existence of another super-frame group, and transmits a re-synchronization end tone 801. Peripheral super-frame group radio communication apparatuses C and E relay the received re-synchronization end tone by means of re-synchronization end tones 802 and 803. However, in the case of radio communication apparatus A and radio communication apparatus G, the end tone slot ends before those re-synchronization end tones 804 and 805 are relayed to them, and therefore radio communication apparatus A and radio communication apparatus G do not enter a re-synchronization state.

However, radio communication apparatuses A and G transmit a re-synchronization end tone in the next super-frame so as to synchronize with end tones output in synchronization by radio communication apparatuses B through F, and a single synchronization timing is achieved overall.

This concludes a description of super-frame re-synchronization processing.

Next, data transmission/reception operation will be described.

First, after generating a data frame, RTS/CTS-e data frame transmitting section 135 gives a directive for data frame transmission to frame transmitting/receiving section 131. On receiving this, frame transmitting/receiving section 131 transmits send/receive tone 205 via narrowband communication section 102. After completion of send/receive tone 205 transmission, frame transmitting/receiving section 131 transmits data in a narrowband signal via broadband communication section 101.

By this means, a node in a frame wait state always need only wait for a narrowband signal, and standby is possible with lower power consumption than when always waiting for a broadband signal.

Figure 10:
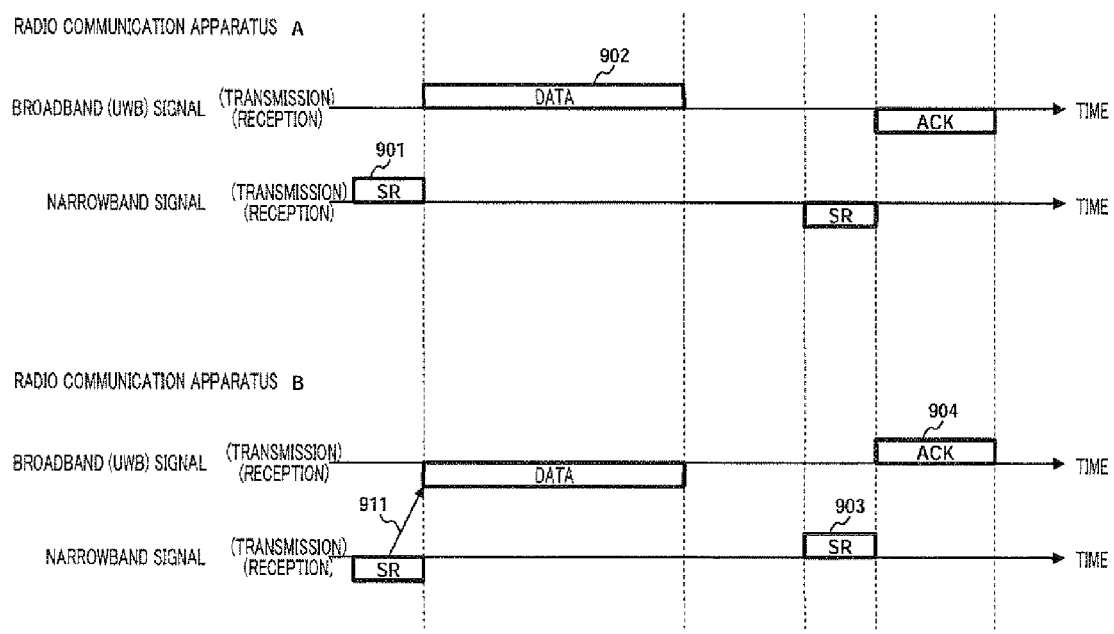
FIG. 10 is a drawing showing a data transmission/reception operation according to Embodiment 1 of the present invention.

FIG. 10 is a drawing showing this data transmission/reception operation.

Radio communication apparatus A transmits a data frame to radio communication apparatus B and receives a corresponding acknowledge frame (ACK). Both enter a reception wait state unless transmitting a narrowband signal. Radio communication apparatus A transmits a send/receive tone (SR) 901 before data 902 transmission, and, on receiving this, radio communication apparatus B transits to a narrowband signal reception wait state (S911). Similarly, radio communication apparatus B transmits a send/receive tone (SR) 903 and then transmits ACK 904. This send/receive tone is transmitted before transmission of any frame.

Next, a description will be given of probe processing for acquiring the communication state of a peripheral node.

When starting communication, a radio communication apparatus needs to ascertain the existence and address of the communicating party. Also, to prevent a collision with a communication signal from another node, it is necessary to check the existence of peripheral nodes. For this purpose, in this embodiment, the attributes, communication environment, and so forth, of a peripheral node are acquired using a probe command.

Probe slot 223 can only be used for probe transmission/reception, but its length can be changed dynamically as necessary. If there is no probe transmission request, it is also possible to terminate the probe slot at that point in time. However, with a probe slot, a radio communication apparatus can only perform transmission/reception of one set of probes in one super-frame, and therefore there is a possibility of a plurality of requests colliding. Beginning tones 1 (203, 209) and beginning tones 2 (204, 210) are used to solve this problem.

When multicasting is performed, the system is normally prepared for collision with a node at a nearby location when carrying out transmission, but when beginning tones 1 and 2 are used, each node categorizes itself as a probe-request-source node, a probe response node, or a silent node in order to prevent a collision.

FIG. 11A is a flowchart explaining probe processing of a request-side radio communication apparatus, and FIG. 11B is a flowchart explaining probe processing of a response-side radio communication apparatus.

In FIG. 11A, first, probe transmitting section 137 of a probe-requesting node performs tone signal carrier sense, and when this is cleared, gives a directive for transmission of beginning tone 1 (BT1) 203 to beginning tone control section 134. Beginning tone control section 134 transmits beginning tone 1 (203) via narrowband communication section 102 at the point in time at which the end tone slot ends (step S101). At this time, narrowband communication section 102 transmits beginning tone 1. Then the node that has completed transmission of beginning tone 1 places broadband communication section 101 in the "on" state in this probe slot (step S102), and operates as a requesting node.

On the other hand, in FIG. 11B, narrowband communication section 102 of a node not making a request is in a tone signal reception state, and, on receiving beginning tone 1 (step S121), notifies beginning tone control section 134. Beginning tone control section 134 receives this notification and transmits beginning tone 2 (BT2) 204 (step S122). Then, this node that received beginning tone 1 places broadband communication section 101 in the "on" state in current probe slot 223 (step S123), and operates as a responding node. On receiving beginning tone 1, narrowband communication section 102 of a node planning a probe request becomes a responding node, and halts beginning tone 1 transmission.

A node that receives beginning tone 2 transmitted from a node that received beginning tone 1 (step S131) keeps broadband communication section 101 in the "off" state during that probe slot 223 and operates as a silent node.

Next, in FIG. 11A, beginning tone control section 134 of the requesting node checks reception of beginning tone 2 (step S103), and on receiving confirmation, notifies probe transmitting section 137. Probe transmitting section 137 receives this notification and sends a probe request frame to frame transmitting/receiving section 131. Frame transmitting/receiving section 131 receives this, places broadband communication section 101 in the "on" state, and transmits probe request (PB) 211 via broadband communication section 101 (step S104).

On the other hand, in FIG. 11B, on receiving the probe request frame (step S124), broadband communication section 101 of the responding node sends that frame to frame transmitting/receiving section 131. On determining that the received frame is a probe request, frame transmitting/receiving section 131 notifies probe receiving section 136. Probe receiving section 136 receives this notification, and generates information on the apparatus's attributes and communication environment (step S125). Then probe receiving section 136 sends a directive to frame transmitting/receiving section 131 to transmit a probe response containing these items of information. Frame transmitting/receiving section 131 receives this and transmits probe response (PR) 212 via broadband communication section 101 (step S126).

At this time, frame transmitting/receiving section 131 applies back-off and responds at random timing in order to prevent a collision with probe response (PR) 212 transmitted from another responding node. Back-off here refers to a method whereby the timing at which retransmission is performed when a collision is detected is calculated more randomly, and retransmission is performed after the elapse of the calculated time.

Before transmitting probe response 212 by means of broadband communication, frame transmitting/receiving section 131 transmits a send/receive tone 207 in the same way as in ordinary frame transmission.

In the case of a silent node, broadband communication section 101 is in the "off" state, and therefore broadband communication section 101 does not receive a probe request or probe response.

Next, in FIG. 11A, narrowband communication section 102 of the requesting node relays send/receive tone 207 at the point in time at which narrowband communication section 102 receives this send/receive tone. By this means, a responding node on the opposite side can suppress the start of response probe transmission at the same time via a radio communication apparatus that started a response (responding node) and the probe requester. As a result, normally performed collision avoidance processing by means of RTS/CTS can be greatly shortened.

Then, on receiving a probe request frame (step S105), requesting node broadband communication section 101 sends this to frame transmitting/receiving section 131. On determining that the received frame is a probe request, frame transmitting/receiving section 131 notifies probe transmitting section 137. Probe transmitting section 137 receives this notification, and stores and updates it as peripheral node attribute and communication environment information (step S106).

Next, probe transmitting section 137 gives a directive to frame transmitting/receiving section 131 for ACK or NACK transmission as a response to the probe response. Frame transmitting/receiving section 131 sends a send/receive tone 208 via narrowband communication section 102, and then transmits an ACK or NACK frame via broadband communication section 101 (step S107).

On the other hand, in FIG. 11B, on receiving this ACK or NACK response (step S127), the responding node enters a state of waiting for reception of "probe end" giving notification of the end of the probe slot.

Also, another responding node that receives this ACK or NACK response and has not transmitted a probe response restarts a back-off countdown. Then that responding node performs probe response transmission after completion of the countdown (step S126).

On the other hand, in FIG. 11A, probe request node probe transmitting section 137 returns to step S105 until completion of the maximum back-off count started after probe request transmission (step S108), and performs reception processing of a response probe from another responding node. This maximum back-off count counts a predetermined time period in consideration of a back-off response, and probe transmitting section 137 considers a probe slot to have ended when this maximum back-off count is completed. Probe request node probe transmitting section 137 halts the same countdown as the responding node during reception of a probe response, and if a collision should occur during back-off, begins a maximum back-off countdown anew. By this means, sufficient time can be secured to enable a responding node to respond without fail, and when the number of responding nodes is small, probe termination can be performed with a correspondingly short wait time.

Following this, probe request node probe transmitting section 137 transmits a probe end frame to report the end of the probe slot. At this time, probe transmitting section 137 gives a directive for transmitting beginning tone 1 again to beginning tone control section 134. Beginning tone control section 134 transmits beginning tone 1 (209) via narrowband communication section 102 in the same way as in step S101 (step S109). By this means, a silent node within a two-hop area can return to normal transmit/receive mode.

Then, in the same way as in step S103, when beginning tone control section 134 receives beginning tone 2 (210) (step S110), probe transmitting section 137 gives a directive for "probe end" transmission to frame transmitting/receiving section 131. Frame transmitting/receiving section 131 receives this, transmits probe end (PE) 214 via broadband communication section 101 (step S111), and terminates this probe slot.

On the other hand, in FIG. 11B, on receiving beginning tone 1 (step S128), responding node beginning tone control section 134 transmits beginning tone 2 (step S129), and after transmission is completed, frame transmitting/receiving section 131 receives probe end (214) (step S130) and regards this as the end of the probe slot.

Thus, when probe processing is performed, if two or more nodes transmit beginning tone 1 within a one-hop area, one or the other can transmit by means of carrier sense, and the other(s) wait(s) for reception.

Probe operations will now be described using an actual example.

FIG. 12 shows beginning tone 1 and 2 transmission/reception operations when radio communication apparatuses A through D are located within two hops.

Figure 12A:
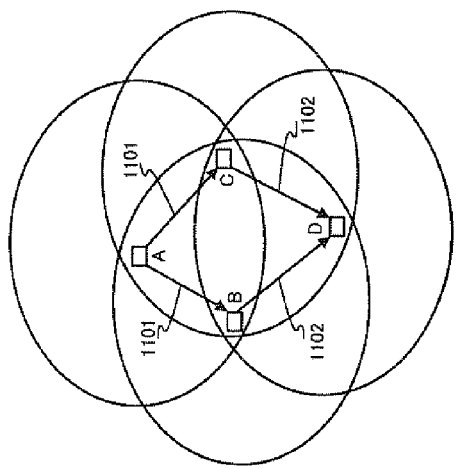
FIG. 12A is an arrangement drawing of a case in which radio communication apparatuses according to Embodiment 1 of the present invention are located within two hops.
Figure 12B:
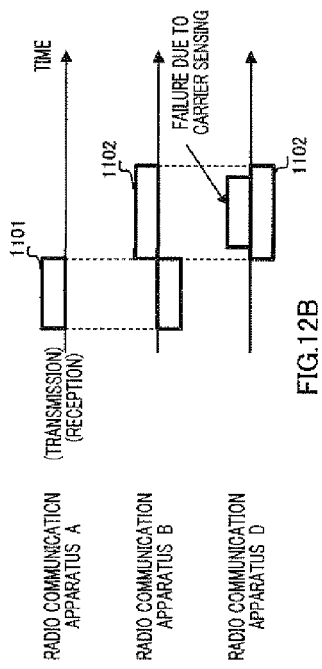
FIG. 12B is a drawing showing beginning tone 1 and 2 transmission/reception operations of radio communication apparatuses according to Embodiment 1 of the present invention.

In FIG. 12A, radio communication apparatus A and radio communication apparatus D are assumed to be nodes that make probe requests. At this time, as shown in FIG. 12B, radio communication apparatus A first transmits a beginning tone 1 (1101), and after transmission of that beginning tone 1 is completed, radio communication apparatus D prepares to transmit beginning tone 1 and performs carrier sense. In this case, since radio communication apparatuses B and C are already transmitting a beginning tone 2 (1102) in response to beginning tone 1 (1101) from radio communication apparatus A, radio communication apparatus D receives beginning tone 2 (1102) during carrier sense or before carrier sense, and therefore makes its own apparatus a silent node. Therefore, radio communication apparatus A acquires the probe request transmission right.

Figure 12C:
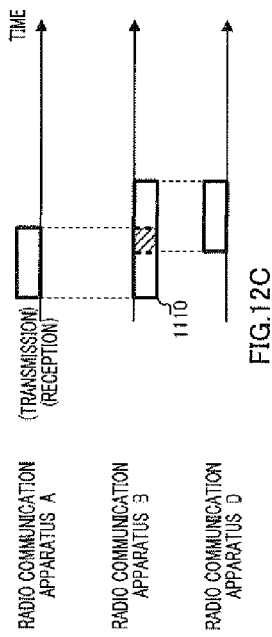
FIG. 12C is a drawing showing beginning tone 1 and 2 transmission/reception operations of radio communication apparatuses according to Embodiment 1 of the present invention.

Next, as shown in FIG. 12C, when beginning tone 1 transmission by radio communication apparatus A and beginning tone 1 transmission by radio communication apparatus D are performed with a difference of the duration of beginning tone 1 or less, radio communication apparatuses B and C receive a tone signal 1110 longer than the duration of beginning tone 1 and shorter than the duration of an end tone. Consequently, radio communication apparatuses B and C determine the received tone signal to be beginning tone 2. Therefore, radio communication apparatuses B and C become silent nodes, and do not give a response in the current probe slot. Radio communication apparatuses B and C cannot participate in probe processing, but do not interfere with radio communication apparatus A and D communications due to becoming silent nodes.

Thus, by means of probe processing using beginning tones 1 and 2 of the present invention, each radio communication apparatus can become an appropriate node (requesting node, responding node, or silent node) in a probe slot.

Next, operations when two or more nodes make probe requests within a three-hop area will be described.

FIG. 13 shows beginning tone 1 and 2 transmission/reception operations when radio communication apparatuses A through E are located within three hops.

Figure 13A:
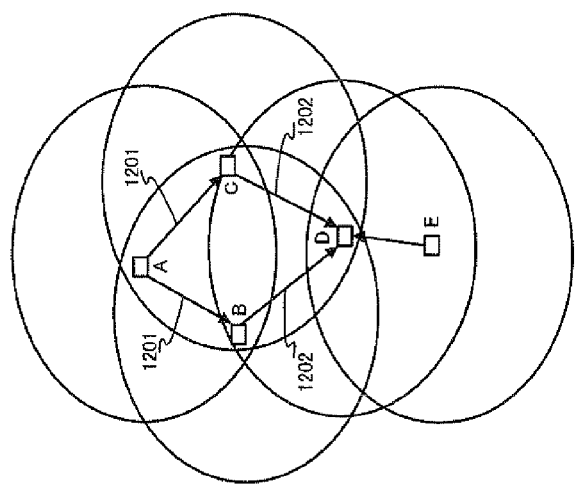
FIG. 13A is an arrangement drawing of a case in which radio communication apparatuses according to Embodiment 1 of the present invention are located within three hops.
Figure 13B:
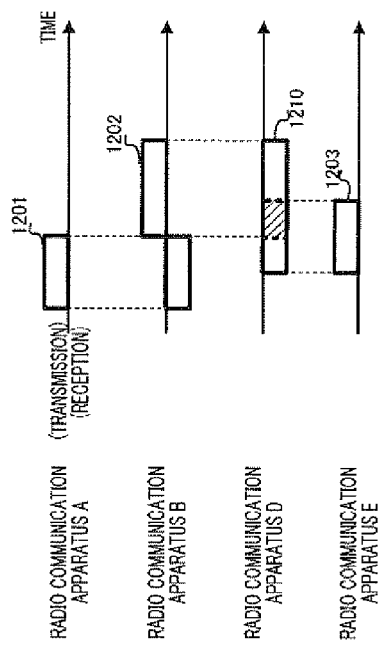
FIG. 13B is a drawing showing beginning tone 1 and 2 transmission/reception operations of radio communication apparatuses according to Embodiment 1 of the present invention.

In FIG. 13A, radio communication apparatuses A and E are assumed to be nodes that make probe requests. At this time, as shown in FIG. 13B, radio communication apparatus A first transmits a beginning tone 1 (1201), and, at timing prior to completion of transmission of that beginning tone 1, a beginning tone 1 (1203) is transmitted from radio communication apparatus E. In this case, radio communication apparatuses B and C receive beginning tone 1 (1201) only from radio communication apparatus A, and therefore transmit a beginning tone 2 (1202) in response thereto. Therefore, radio communication apparatus D starts receiving beginning tone 2 (1202) during reception of beginning tone 1 (1203) from radio communication apparatus E, and so receives a tone signal 1210 longer than the duration of beginning tone 1 and shorter than the duration of an end tone. Consequently, radio communication apparatus D determines the received tone signal to be beginning tone 2, and becomes a silent node.

Thus, according to probe processing of the present invention, even if a plurality of probe processing occurs virtually simultaneously, one probe processing is allowed to succeed, and the other probe request node is silenced, enabling both probe requests to proceed smoothly without colliding.

Only one probe request is executed in a probe slot, but a silent node may also receive a plurality of beginning tones 2. In this case, the silent node cannot return to the normal standby state unless beginning tone 2 is received before "probe end" is transmitted the number of times beginning tone 2 is received. If two beginning tones 2 are not received for some reason, the silent node remains silent for the maximum back-off count period.

The above description is summarized in FIG. 14 and FIG. 15.

FIG. 14 and FIG. 15 show operations of a radio communication apparatus according to the present invention when a tone signal is received.

In FIG. 14 and FIG. 15, each row shows a super-frame slot, and each column shows a received tone signal. For example, it is shown that when beginning tone 1 is received in a probe slot before probe request reception, beginning tone 2 is transmitted, and broadband signal synchronization is started to receive a probe request.

According to the present invention, a MAC protocol can be used that is restricted so that only an apparatus that performs transmission/reception transmits a beacon or suchlike management command frame. That is to say, an apparatus that does not perform transmission/reception needs not transmit a beacon or the like as a sleep state mode.

Furthermore, according to this embodiment, RTS/CTS is a scheme that extends conventional RTS/CTS (the RTS/CTS-e scheme).

With the RTS/CTS scheme, originally a radio communication apparatus transmits data using the band immediately after transmitting the relevant command frame, but in this embodiment, a data transmission time period is reserved by specifying a time up to a specifiable time (for example, 64 milliseconds). This provides a substitute for TDMA time reservation.

Also, when a radio communication apparatus performs reservations consecutively, a slot for the next RTS/CTS-e exchange is also reserved. By this means, it is also possible to support isochronous communication and so forth.

In this embodiment, the RTS/CTS-e scheme is a 4-way handshake scheme. That is to say, in the initial handshake, free time of the communicating party is checked, and, in the next RTS/CTS-e handshake, the actual transmission time is confirmed and reported in the surrounding area.

The reason for adopting this 4-way scheme is that suppressing RTS/CTS-e updating by another radio communication apparatus with an NAV (Network Allocation Vector) enables the latest communicating-party schedule at the present point in time to be checked.

Specification methods of reserved time include a method of actual time specification and a method of slot specification in line with synchronization timing. With the slot specification method, by adding time up to the start time of the apparatus's next super-frame period, determination of a slot position is possible even in the event of a collision with another super-frame group. Then, a collision with another super-frame group can be avoided by prohibiting the use of the apparatus's super-frame group slot position corresponding to a slot of that other super-frame group.

Thus, as compared with the actual time specification method, the slot specification method enables the amount of data communicated to be reduced, but on the other hand incurs the possibility of taking more time than necessary. However, it does not matter which of the specification methods is used.

Using millimeter wave UWB enables directivity to be utilized. That is to say, frame transmitting/receiving section 131 transmits a series of tone signals and RTS/CTS frames by means of a non-directional radio wave. Then, when performing actual data, ACK, or suchlike transmission, frame transmitting/receiving section 131 predicts the direction of arrival of a radio wave when RTS/CTS is received, and when actually transmitting data, transmits or receives a directional radio wave in the predicted direction of arrival.

Figure 16:
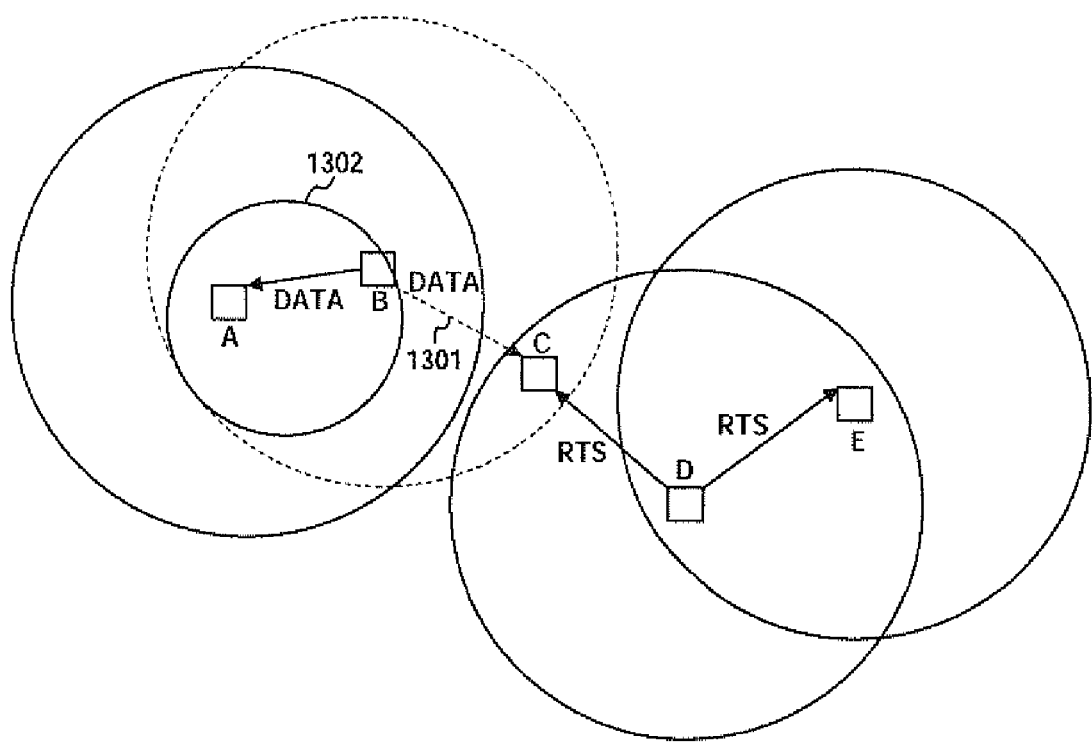
FIG. 16 is a drawing explaining collision avoidance by means of RTS/CTS according to Embodiment 1 of the present invention.

FIG. 16 is a drawing explaining collision avoidance when a radio communication apparatus transmits RTS/CTS by means of a non-directional radio wave and estimates the direction of arrival of RTS/CTS for data exchange.

In FIG. 16, if radio communication apparatus B transmits data by means of a directional radio wave when radio communication apparatus D is transmitting RTS by means of a non-directional radio wave, communication area 1302 of radio communication apparatus B does not include radio communication apparatus C. Therefore, data wave 1301 does not reach radio communication apparatus C, and does not interfere with RTS reception.

By having a beacon or RTS/CTS-e exchange not performed other than by a radio communication apparatus that performs transmission/reception in this way, unnecessary transmission/reception in a mobility environment can be avoided. Furthermore, it also becomes possible to start communication at any time while constantly checking surrounding radio communication apparatuses.

For tone signals of this embodiment, individual tones have been identified by differences in duration, but this is not a limitation, and the same kind of effect can also be achieved by means of differences in frequency, relative magnitudes of field strength, temporal fluctuations in field strength, intermittent signal patterns, and so forth.

As described above, according to this embodiment, by using a tone signal instead of a beacon, it is possible for a radio communication apparatus to perform time adjustment within a super-frame without performing frequent beacon arrangement in a mobility environment. By this means, a radio communication apparatus can make probe requests and responses vis-à-vis another radio communication apparatus in a minimal time. Also, since only a communicating radio communication apparatus needs to place its broadband communication section in the "on" state, much time can be spent in the sleep state.

Also, with a radio communication apparatus of this embodiment, a tone signal, which is a narrowband signal, is transmitted before transmitting a broadband signal that communicates a command or data, and therefore only a narrowband signal reception wait state need be used. It is therefore possible for a radio communication apparatus to keep standby power consumption low compared with a case in which a broadband signal is constantly energized.

Embodiment 2

Figure 17:
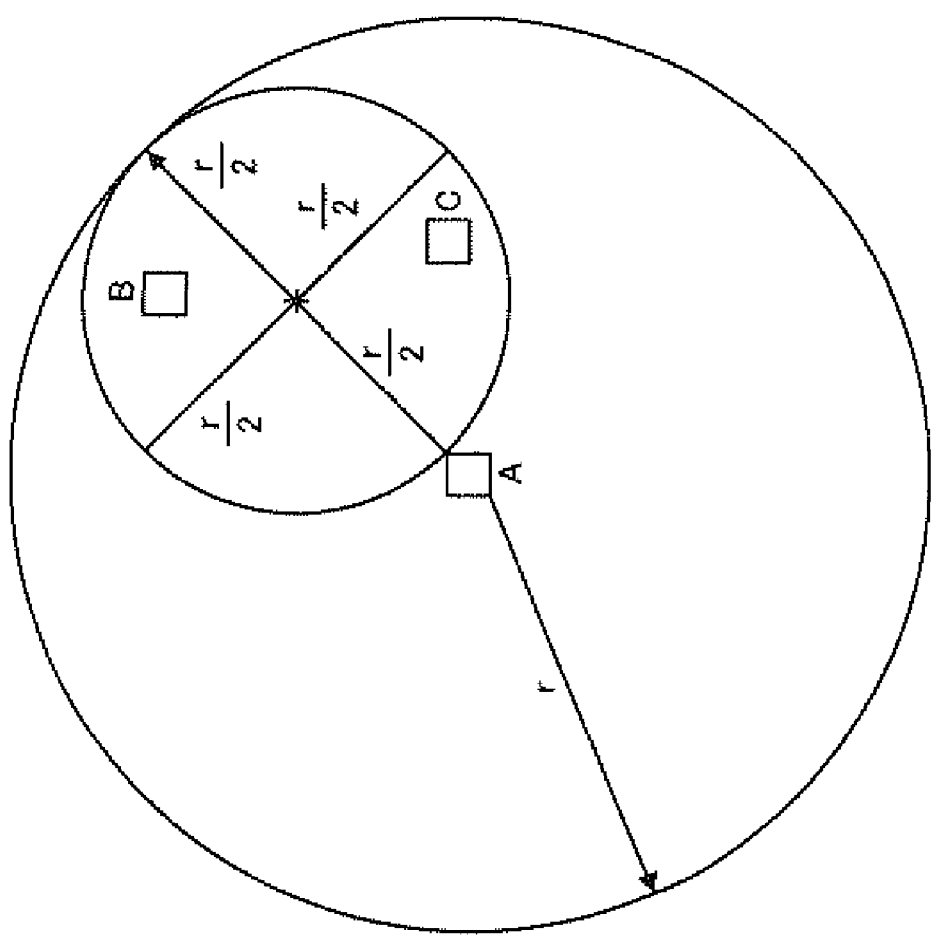
FIG. 17 is a block diagram showing an arrangement of radio communication apparatuses according to Embodiment 2 of the present invention.

A radio communication apparatus according to this embodiment transmits a probe request, or returns a response, by means of a directional antenna to all surrounding nodes. The configuration of a radio communication apparatus according to this embodiment is identical to the configuration according to Embodiment 1, but the directional antenna communication range must be an area that allows all nodes of the probe request frame coverage area to communicate with each other. For example, when the directional antenna coverage area is an area of radius r, as shown in FIG. 17, a state is established in which arbitrary nodes B and C within a circle of radius r and with its center at a point r/2 in the direction in which the antenna is facing can perform mutual transmission and reception. When a radio communication apparatus in such an arrangement issues a probe request, a response thereto can achieve collision avoidance by means of normal carrier sense.

A radio communication apparatus according to this embodiment is more suited to an access point whose orientation is fixed than to a mobile communication terminal whose orientation changes.

Probe request and response operations of radio communication apparatuses configured in this way will now be described.

Probe request/response operations according to this embodiment differ from Embodiment 1 in that, after a probe request node has transmitted beginning tone 1 to all peripheral nodes, probe requests are made on a sector-by-sector basis.

First, a probe request node transmits beginning tone 1 in the same way as with an ordinary probe. On the other hand, a responding node transmits beginning tone 2. Then the probe request node declares that this is a sector probe, and reports that a probe request has started. Next, the probe request node transmits only a send/receive tone with directivity narrowed down to each sector. A peripheral responding node that receives such a send/receive tone with no data starts a back-off counter and returns its response randomly. The probe request node measures the maximum back-off time assigned to each sector, and after searching all sectors, transmits beginning tone 1 again and then transmits "probe end".

As described above, according to this embodiment, a sector probe narrows down the range, in which transmission is performed, compared with an ordinary probe, enabling the possibility of a collision to be eliminated by means of carrier sense alone. Also, since the communication range is narrow, a maximum back-off count and the like can be limited, resulting in the possibility of probe responses converging at higher speed.

As with an ordinary probe request, only one sector probe is executed in a probe slot, but a silent node may also receive a plurality of beginning tones 2. In this case, the silent node cannot return to the normal standby state unless beginning tone 2 is received before "probe end" is transmitted the number of times beginning tone 2 is received. If two beginning tones 2 are not received for some reason, the silent node remains silent during the maximum back-off count.

Embodiment 3

A radio communication method according to this embodiment uses a send/receive tone and end tone in the same way as in Embodiment 1, but differs in not using beginning tones 1 and 2.

Figure 18:
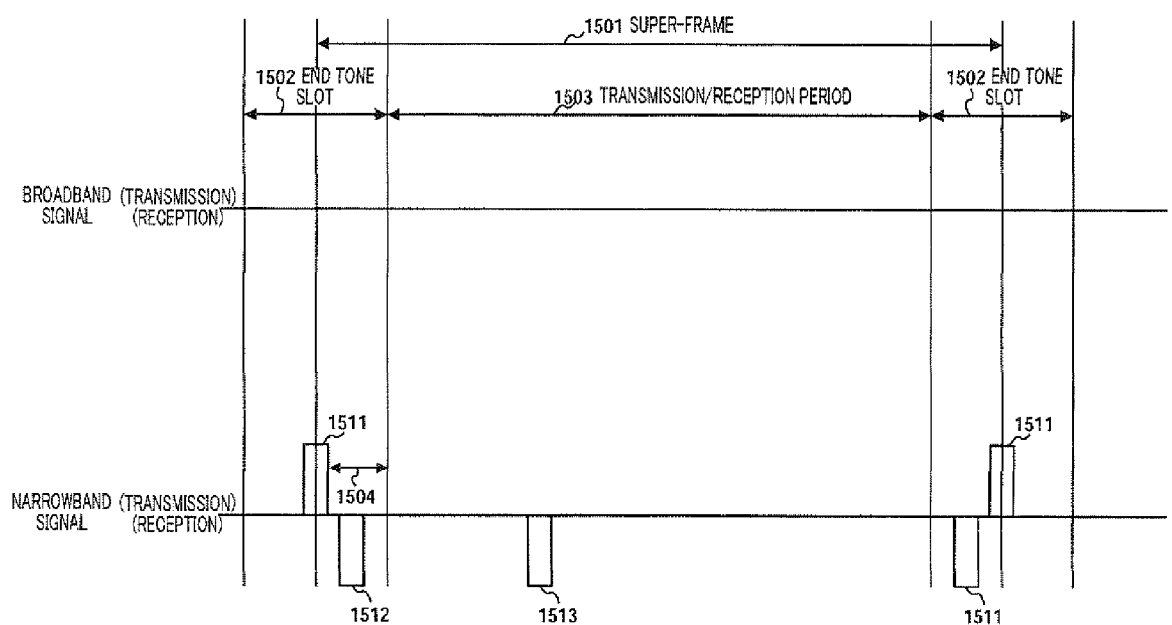
FIG. 18 is a timing chart explaining the super-frame tone signals and frame according to Embodiment 3 of the present invention.

FIG. 18 is a timing chart explaining the super-frame tone signals and frame according to this embodiment.

In FIG. 18, a super-frame 1501 is composed of end tone slots 1502 and a transmission/reception period 1503. There are only two tone signals—an end tone 1511 and a send/receive tone 1513—and a send/receive tone 1512 transmitted in an end tone re-synchronization slot 1504, which is a special time period after an end tone is transmitted, is given a special designation of "probe tone."

A send/receive tone, when received by transmission/reception period 1503, gives notification of transmission/reception of a command or data by means of a broadband signal in the same way as in Embodiment 1.

However, send/receive tone 1512 received after end tone reception in an end tone slot gives notification that a broadband signal reception wait state is to be set and an RTS/CTS-e control frame is to be acquired in the next super-frame. Then the radio communication apparatus transmits a probe response at random timing in the next super-frame in which a control frame is acquired.

End tone processing is the same as in Embodiment 1.

Figure 19:
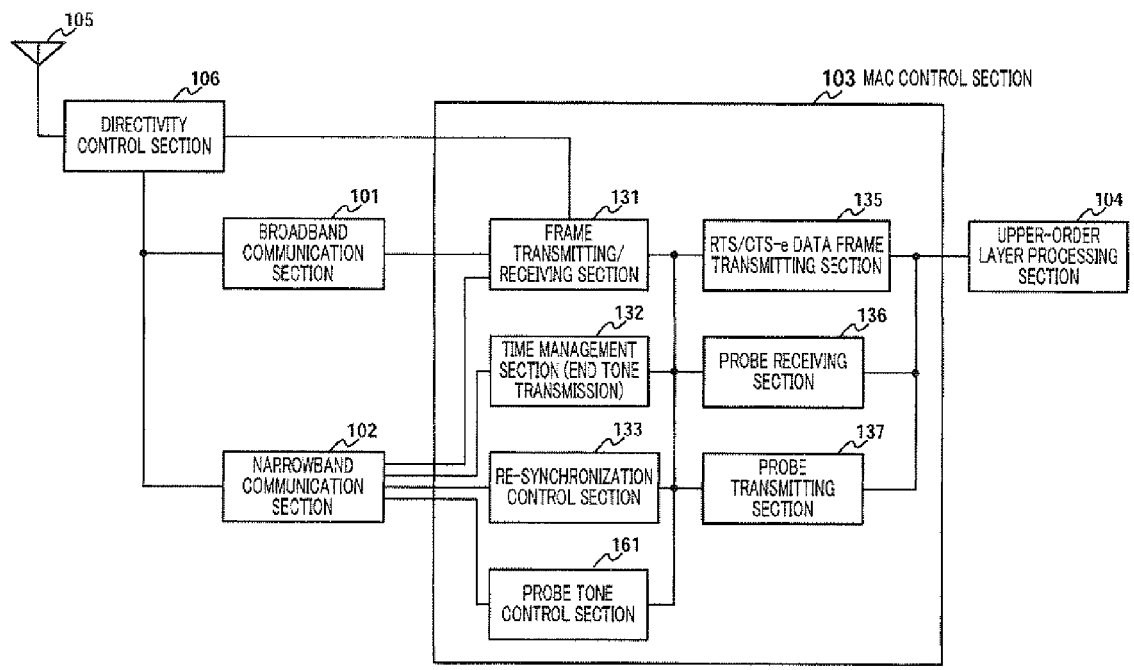
FIG. 19 is a drawing showing the configuration of a radio communication apparatus according to Embodiment 3 of the present invention.

FIG. 19 is a configuration diagram showing the configuration of a radio communication apparatus according to this embodiment. The configuration in this embodiment differs from that of Embodiment 1 shown in FIG. 2 in having a probe tone control section 161 instead of beginning tone control section 134.

On receiving a probe tone signal from another radio communication apparatus, probe tone control section 161 directs frame transmitting/receiving section 131 to perform RTS/CTS-e frame reception in that super-frame. Also, when probe transmitting section 137 receives an inquiry concerning the surrounding situation from upper-order layer processing section 104, probe tone control section 161 is directed to transmit a probe tone from probe transmitting section 137. Then probe tone control section 161 causes narrowband communication section 102 to transmit a send/receive tone—that is, a probe tone—after the end tone.

Operations whereby radio communication apparatuses having the above configuration make a probe request and a response thereto will now be described.

Figures 20A, 20B:
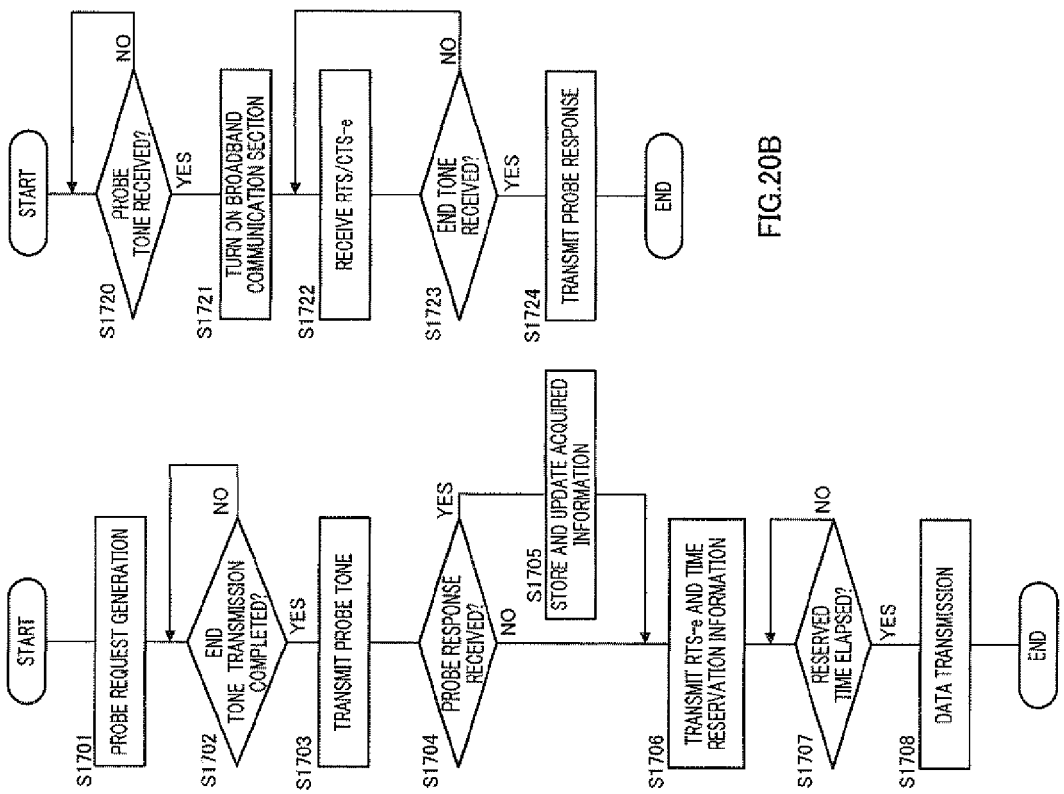
FIG. 20A is an operation flowchart of a probe-request-source radio communication apparatus according to Embodiment 3 of the present invention.
FIG. 20B is an operation flowchart of a probe-responding radio communication apparatus according to Embodiment 3 of the present invention.

FIG. 20A is an operation flowchart of a probe-request-source radio communication apparatus, and FIG. 20B is an operation flowchart of a probe-responding radio communication apparatus.

In FIG. 20A, first, when probe transmitting section 137 receives an inquiry concerning the surrounding situation from upper-order layer processing section 104, it recognizes probe request generation (step S1701), and directs probe tone control section 161 to transmit a probe tone. Probe tone control section 161 receives this and, after end tone transmission (step S1702), transmits send/receive tone 1512—that is, a probe tone—via narrowband communication section 102 (step S1703).

Following this, time management section 132 transmits an end tone, broadband communication section 101 is turned on, and a probe response frame reception wait state is entered (step S1704). Then, when broadband communication section 101 receives a probe response frame, frame transmitting/receiving section 131 stores and updates acquired transmitting radio communication apparatus information such as attributes and communication environment (step S1705).

Next, if the communicating party matches the attributes of this apparatus, RTS/CTS-e data frame transmitting section 135 transmits time reservation information until the start of RTS-e command and data transmission in order to start transmission/reception (step S1706).

Following this, when the reserved time has elapsed (step S1707), RTS/CTS-e data frame transmitting section 135 transmits a data frame (step S1708). In steps S1705 through S1708, processing is performed in parallel by receiving probe requests from a plurality of radio communication apparatuses.

On the other hand, in FIG. 20B, when a radio communication apparatus receives a probe tone (step S1720) it becomes a responding node, and turns on broadband communication section 101 (step S1721). Then broadband communication section 101 enters a broadband signal reception wait state during that super-frame, and receives an RTS/CTS-e frame transmitted by another radio communication apparatus (step S1722).

Then, when time management section 132 receives an end tone (step S1723) and the next super-frame begins, probe receiving section 136 generates attribute, communication environment, and suchlike information for making a probe response, and gives a directive for probe response transmission to frame transmitting/receiving section 131. Frame transmitting/receiving section 131 starts a back-off count in the transmission/reception period, and transmits a probe response frame in an empty slot (step S1724).

Thus, according to this embodiment, since a probe response node completes acquisition during one super-frame, which is the maximum time for which RTS/CTS-e reception can be reserved by RTS/CTS-e, a probe request node and probe response node can start RTS/CTS-e reception immediately. Also, in a radio communication method according to this embodiment, since a probe slot is not provided, that time can also be used for data transmission/reception. Furthermore, since a beginning tone is not used, it is also possible to shorten an end tone.

In this embodiment, individual tones in tone signals have been identified by differences in duration, but this is not a limitation, and the same kind of effect can also be achieved by means of differences in frequency, relative magnitudes of field strength, temporal fluctuations in field strength, intermittent signal patterns, and so forth.

Embodiment 4

A radio communication apparatus according to this embodiment is a mobile file exchange apparatus incorporating a MAC protocol that implements the radio communication method of Embodiment 3. Exchanged files are music files, video files, and game software.

Figure 21:
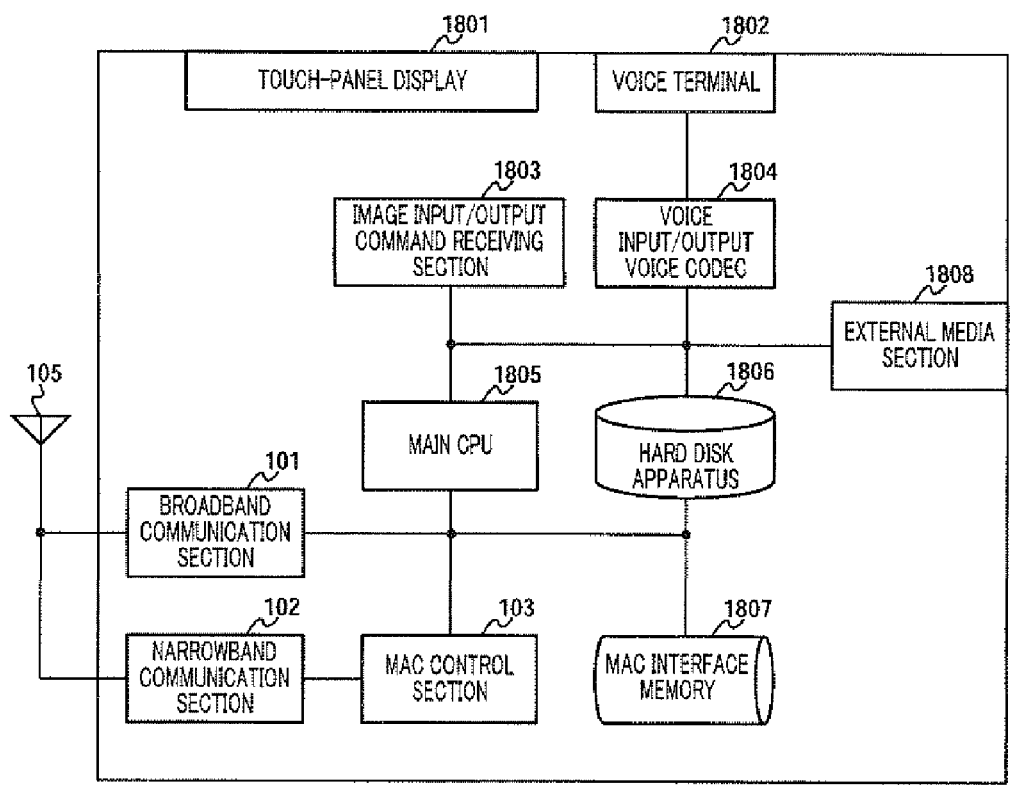
FIG. 21 is a drawing showing the configuration of a mobile file exchange apparatus according to Embodiment 4 of the present invention.

FIG. 21 is a configuration diagram of a mobile file exchange apparatus according to this embodiment.

In FIG. 21, a mobile file exchange apparatus has a touch-panel display 1801, a voice terminal 1802, an image input/output command receiving section 1803, a voice input/output voice codec 1804, a main CPU 1805, a hard disk apparatus 1806, MAC interface memory 1807, an external media section 1808, a broadband communication section 101, a narrowband communication section 102, a MAC control section 103, and an antenna 105.

Broadband communication section 101, narrowband communication section 102, MAC control section 103, and antenna 105 are identical to those described in Embodiment 2.

The operation of this mobile file exchange apparatus will now be described.

First, music software, video software, and game software playback operations will be described.

First, a user installs the software he wishes to use from external media section 1808, and stores it in hard disk apparatus 1806. Then a command input from touch-panel display 1801 is converted to a plurality of signals by image input/output command receiving section 1803, and then conveyed to main CPU 1805.

When a music playback command is input, main CPU 1805 gives a directive to voice input/output voice codec 1804, which decodes music software from hard disk apparatus 1806 and outputs it from voice terminal 1802.

When a command that executes video or a game is input, in addition to voice playback, main CPU 1805 displays video on touch-panel display 1801 via image input/output command receiving section 1803.

Next, an operation whereby music software, video software, or game software file exchange is performed with another mobile file exchange apparatus will be described.

First, in order to start an UWB (wideband communication) communication procedure when beginning file exchange, on receiving a start command from main CPU 1805, MAC control section 103 causes narrowband communication section 102 to search for an end tone. Then, when narrowband communication section 102 detects an end tone, re-synchronization processing is started that performs synchronization with the first end tone detected.

Next, when MAC control section 103 receives a probe tone, narrowband communication section 102 enters an RTS/CTS-e control frame reception wait state in order to transmit a probe response. Then broadband communication section 101 transmits a response randomly in the super-frame one super-frame later.

Then narrowband communication section 102 transmits an end tone for end tone re-synchronization once in N times. Count N depends on the super-frame period time, but a count that gives from a one to two second period is suitable. Counting is performed from the time of joining in the case of a node that newly joins a super-frame group, and from execution of the previous super-frame group re-synchronization processing in the case of other nodes. These nodes enter an end tone reception wait state during re-synchronization processing, and are synchronized at the timing at which a new end tone is received.

If a probe tone has not been transmitted and received even once within a predetermined number of end tones, or in the case of addition to a new super-frame group through end tone re-synchronization processing, each node transmits a probe tone. Each node that receives a probe tone receives an RTS/CTS-e frame while continuing to perform re-synchronization processing. Then, after waiting for reception of one super-frame, each node that has received a probe tone transmits a probe response after the elapse of a random time period. Probe response transmission by each node is performed during the next super-frame after transmission of the probe tone.

Next, the probe request node checks the attribute list of nodes for which there was a response, and for those that returned music software exchange, video exchange, and game software exchange attributes, performs differential exchange—that is, exchanges only software possessed by one and not possessed by the others. Therefore, a node that has started exchange first transmits a list of IDs of its own exchangeable software. Then a node for which exchange has been presented transmits a list of IDs of its own exchangeable software in response to the received list, and also issues a transfer request for software possessed by the counterpart node that its own node does not possess and has no experience of exchanging for several months.

A node that has initiated a file exchange request responds to a software transfer based thereupon and also makes the node's transfer request to the responding side. In file exchange processing, transfer operations of a file of a mutually predetermined volume—for example, 50 MB—at a time are repeated, and are continued until the counterpart node is no longer a nearby node or transfer ends. Then, if necessary, the requesting node updates the transfer time by re-exchange of an RTS/CTS-e frame.

FIG. 22 shows a music software file list managed by a mobile file exchange apparatus.

In FIG. 22, each music ID is identified by a TOC (Table of Content) 1901 and a track number 1904. A title 1902 and artist name 1903 are input by a user or input by means of a CDDB (CD number database) via an access point. These are user information items and are not directly related to file exchange operations.

A music file acquired from a CD, the Internet, or the like, is copied to hard disk apparatus 1806 by external media section 1808. At this time, a media flag 1905 is "on", a shadow flag 1906 is "off", and a time limit 1907 is "unlimited." A list transmitted at the time of media exchange with another mobile file exchange apparatus has only media flag 1905 "on." Exchanged software also remains in its own file list as a song with media flag 1905 in the "on" state, but a time limit is set. For example, when the shadowing time limit is set as 100 days, an item that has not been played back even once after the elapse of 100 days is made a shadow file. Here, a shadow file refers to a file whose existence can be recognized by a user, but that cannot be played back. However, since media flag 1905 is "on" and a music file actually exists in hard disk apparatus 1806, it can be treated as one of its own exchange files.

When the shadowing time limit is exceeded or the possible number of playback times is reached, a file is made a shadow file, and a new time limit is set. Then 100 days is newly set with this as a deletion limit. When this period is expired, music file software is deleted from hard disk apparatus 1806. At this time, an entry with media flag 1905 "on" and the shadow flag "on" is left in the file list with a re-entry suppression time limit set. This re-entry suppression time limit restricts the making of an entry again for a file for which there is no music file already but for which test-listening has been carried out once, which enables a state in which the same file can be listened to any number of times to be prevented. When a re-entry suppression time limit is exceeded, the entry itself disappears, and re-entry becomes possible.

It is also possible to select only items more to one's taste among a large number of exchanged files by, for example, specifying a genre, or restricting music file formats to be listened to. A file not to one's taste is made a shadow file immediately and deleted if the time limit is reached without its having been viewed by the user.

When the user copies that media to another device from external media section 1808, main CPU 1805 confirms that the media flag is "on" and then moves and searches the millimeter wave UWB access point. Alternatively, the user connects to an IP network from a mobile phone with relay capability by means of millimeter wave UWB, confirms that authentication and charging have been carried out using electronic commerce, and then creates an entry with an unlimited time limit in the file list. Then main CPU 1805 sets shadow flag 1906 to "off" and copies a software file in the hard disk apparatus to an external media. When installing purchased software from an external media to its own mobile file exchange apparatus, also, charging is not necessary but authentication is. This is because the exchange of software whose circulation is not desired becomes possible.

Also, when relaying to an IP network by means of UWB, it is desirable for IP processing to terminate at an access point or mobile phone. If this is not done, although an IP address is assigned, millimeter wave UWB will cause confusion in mobile communications with a private address implemented by ordinary IPv4. However, since using a network address for each access point results in inefficient address assignment, it is preferable to use IPv6 or to employ a configuration whereby TCP/IP or higher data is exchanged on a millimeter wave UWB link.

In the above embodiment, the description of exchanged files has been limited to music files, but video file and game software file exchange can also be managed in a similar way.

Also, when exchanging a list of software, if information indicating that the file list time limit is unlimited (that is, that the software has been purchased) is also exchanged, peripheral users can create rankings of purchased software. This can be a purchasing aid for users. Comments such as software recommendations may also be included in the ranking list.

Furthermore, if a mobile file exchange apparatus performs file reception of the mobile file exchange apparatus's own control software, it is possible for updating to be carried out automatically. In this case, it is desirable to enable file exchange to be performed on a priority basis by adding a flag indicating priority or the like to the file.

Embodiment 5

Figure 23:
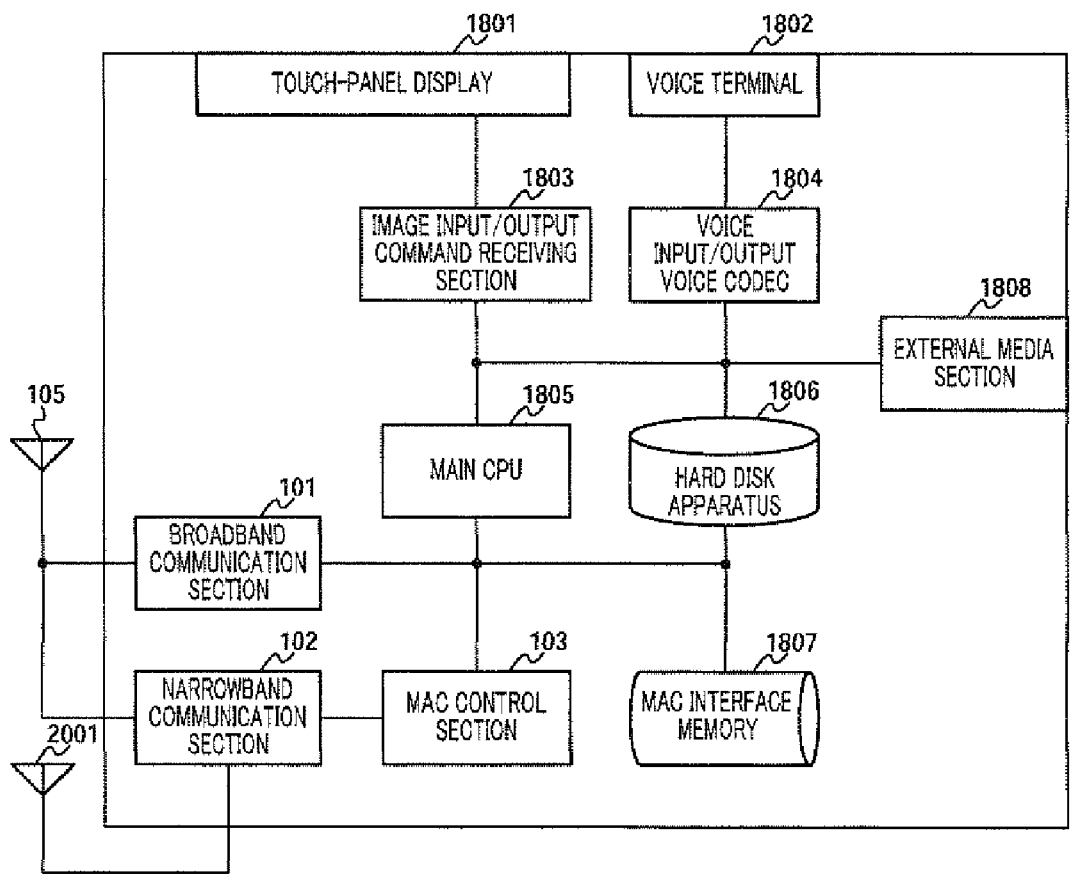
FIG. 23 is a drawing showing the configuration of a mobile file exchange apparatus according to Embodiment 5 of the present invention.

FIG. 23 is a configuration diagram of a mobile file exchange apparatus according to this embodiment. The configuration in this embodiment differs from that of a mobile file exchange apparatus according to Embodiment 4 in also having a unidirectional antenna 2001.

This antenna 2001 is used when it is wished to perform file exchange while visually identifying an opposite party with whom the user wants to communicate.

Figure 24:
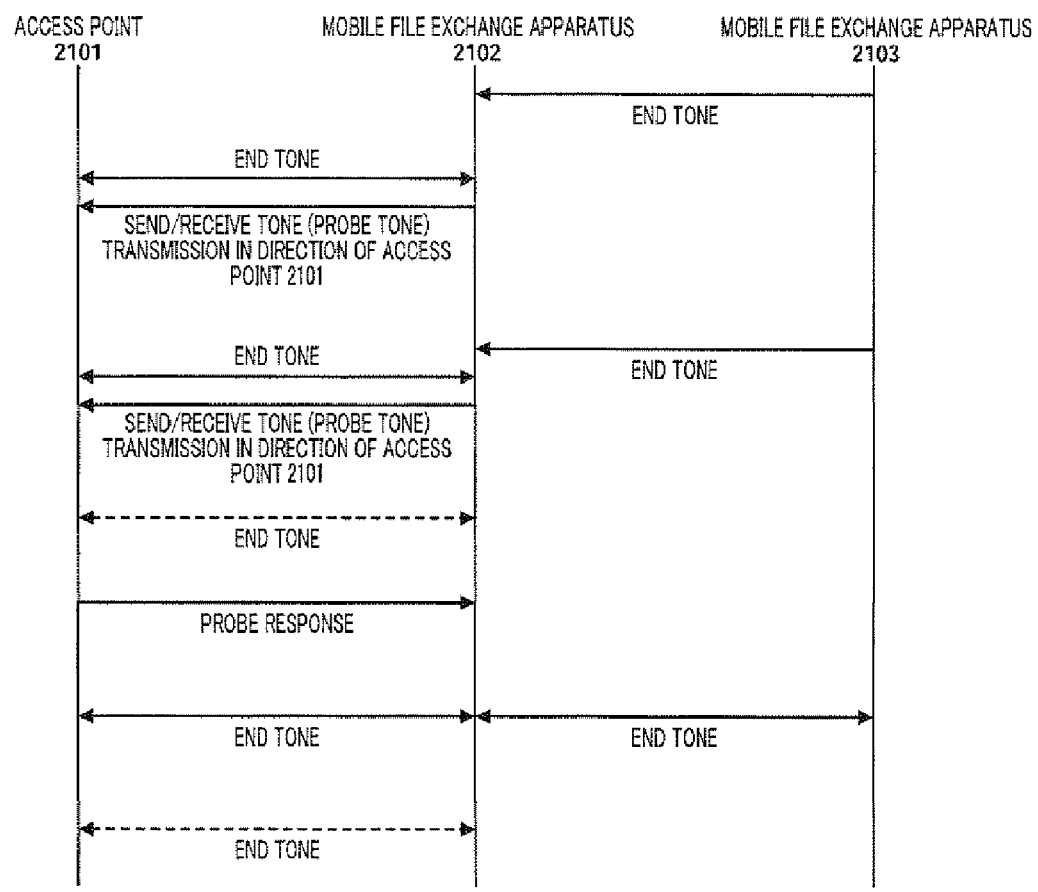
FIG. 24 is a drawing showing a sequence whereby a mobile file exchange apparatus according to Embodiment 5 of the present invention connects to an access point.

FIG. 24 is a sequence diagram for connecting a mobile file exchange apparatus to an access point.

When a probe request command for an access point 2101 is input from the touch panel of a mobile file exchange apparatus 2102, mobile file exchange apparatus 2102 transmits a probe tone at the apparatus's end tone timing. If another mobile file exchange apparatus 2103 transmits an end tone at this time, mobile file exchange apparatus 2102 re-synchronizes with this and transmits a probe tone again.

Next, mobile file exchange apparatus 2102 awakened from sleep by the probe tone transmits a probe response.

Then mobile file exchange apparatus 2102 displays access point 2101 attribute information and so forth transmitted in this probe response on touch-panel display 1801. For example, "Access point—music file exchange" may be displayed.

Next, when the user selects that access point, the display on the touch-panel display is subsequently updated by data exchange using Internet hypertext (http) or the like, and, for example, "Connect" or suchlike command input is performed. At this time, music software charging is performed, for example.

As described above, according to a mobile file exchange apparatus of this embodiment, by means of a restriction of physically directing an antenna toward a target node, a requesting node can start communication and erroneous specification of a counterpart node can be prevented.

Also, if a plurality of mobile file exchange apparatuses are present in a specified direction, and there are a plurality of responses, differences in the directions of arrival of each probe response according to probe response direction-of-arrival estimation are displayed on a display as a plan view. By this means, the user can easily decide which mobile file exchange apparatus to select from among many probe responses.

Embodiment 6

Figure 25:
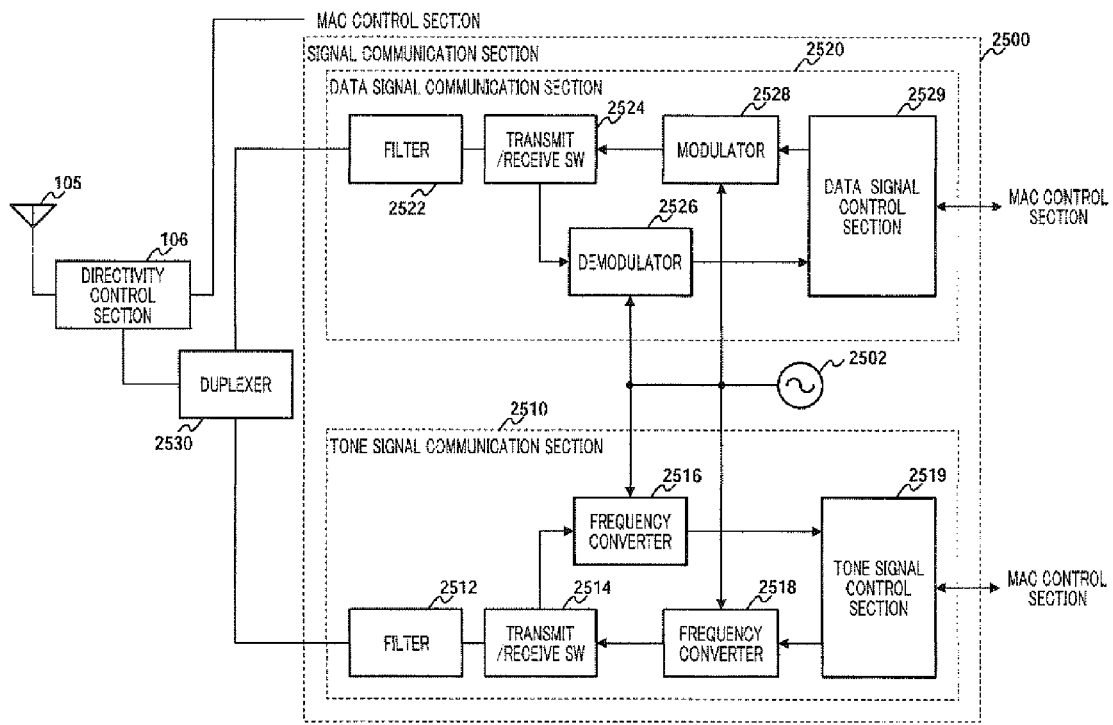
FIG. 25 is a block diagram showing the configuration of a signal communication section according to Embodiment 6 of the present invention.

A configuration according to Embodiment 6 will now be described with reference to FIG. 25. FIG. 25 is a block diagram showing the configuration of a signal communication section 2500 of a radio communication apparatus according to this embodiment.

A radio communication apparatus according to this embodiment differs from that of Embodiment 1 in having a configuration in which the parts comprising broadband communication section 101 and narrowband communication section 102 are not separated into two independent blocks, but instead a signal communication section 2500 is provided that is one integrated block. The configuration and operation of this embodiment corresponding to MAC control section 103 and other parts than broadband communication section 101 and narrowband communication section 102 in Embodiment 1 are identical to those of Embodiment 1, and therefore a description thereof is omitted here.

Signal communication section 2500 is composed of a tone signal communication section 2510, a data signal communication section 2520, and a carrier signal source 2502. Tone signal communication section 2510 is equipped with a transmit/receive switch 2514, a frequency converter 2516, a frequency converter 2518, and a tone signal control section 2519. Similarly, data signal communication section 2520 is equipped with a filter 2522, a transmit/receive switch 2524, a demodulator 2526, a modulator 2528, and a data communication control section 2529.

When transmitting, tone signal communication section 2510 generates a tone signal of predetermined length from a tone signal control signal input from MAC control section 103, performs frequency conversion on this tone signal, and outputs it to a distributor 2530. Here, "tone signal control signal" does not mean an actual tone signal of predetermined length as in FIG. 4, but a logical tone signal indicating what tone signal a signal is, so to speak. In Embodiments 1 through 5, there may simply be a tone signal. Tone signal communication section 2510 performs frequency conversion of the tone signal input from distributor 2530 to convert it to a tone signal control signal, and outputs this to MAC control section 103.

"Tone signal" means a "tone signal control signal" that controls baseband tone signal generation, a "tone signal" for which amplitude, phase, or suchlike modulation is not performed, or a "tone signal superimposed on a carrier" generated by multiplying a tone signal carrier by a carrier frequency.

When transmitting, a filter 2512 band-limits a tone signal input from transmit/receive switch 2514 to a predetermined frequency, and outputs the signal to distributor 2530. When receiving, filter 2512 band-limits a tone signal input from distributor 2530 to a predetermined frequency, and outputs the signal to transmit/receive switch 2514.

Transmit/receive switch 2514 performs signal connection and direction switching between transmission and reception so that, when transmitting, a post-frequency-conversion tone signal input from frequency converter 2518 is output to filter 2512, and when receiving, a tone signal input from filter 2512 is output to frequency converter 2516.

Frequency converter 2516 performs frequency conversion of a tone signal input from transmit/receive switch 2514. That is to say, frequency converter 2516 converts a tone signal to a baseband signal based on a carrier output from carrier signal source 2502, and outputs the converted signal to tone signal control section 2519.

When transmitting, frequency converter 2518 performs frequency conversion of a tone signal input from tone signal control section 2519—that is, converts it to a signal with the carrier output from carrier signal source 2502 as the center frequency—and outputs the converted signal to transmit/receive switch 2514.

When transmitting, tone signal control section 2519 generates a tone signal based on a unique data pattern held in tone signal control section 2519 in accordance with a tone signal control signal input from MAC control section 103, and outputs this signal to frequency converter 2518. When receiving, tone signal control section 2519 has a tone signal input from frequency converter 2516 as input, determines the type of tone signal according to the length of the tone signal, generates a corresponding tone signal control signal, and outputs this signal to MAC control section 103.

Similarly, when transmitting, data signal communication section 2520 modulates a data signal input from MAC control section 103 and outputs the modulated signal to distributor 2530. When receiving, data signal communication section 2520 performs frequency conversion of a data signal input from distributor 2530, and outputs the resulting signal to MAC control section 103.

When transmitting, filter 2522 band-limits a data signal input from transmit/receive switch 2524 to a predetermined frequency, and outputs the signal to distributor 2530. When receiving, filter 2522 band-limits a data signal input from distributor 2530 to a predetermined frequency, and outputs the signal to transmit/receive switch 2524.

Transmit/receive switch 2524 performs signal connection and direction switching between transmission and reception so that, when transmitting, a post-modulation data signal input from modulator 2528 is output to filter 2522, and when receiving, a data signal input from filter 2522 is output to demodulator 2526.

Demodulator 2526 performs demodulation of a data signal input from transmit/receive switch 2524. That is to say, demodulator 2526 converts a data signal to a baseband signal based on a carrier output from carrier signal source 2502, and outputs the converted signal to data communication control section 2529.

When transmitting, modulator 2528 modulates a data signal input from data communication control section 2529—that is, converts it to a signal with the carrier output from carrier signal source 2502 as the center frequency—and outputs the modulated signal to transmit/receive switch 2524.

When transmitting, data communication control section 2529 outputs a data signal input from MAC control section 103 to modulator 2528. When receiving, data communication control section 2529 outputs a data signal input from demodulator 2526 to MAC control section 103.

Carrier signal source 2502 generates a carrier, and outputs the carrier to frequency converter 2516 and demodulator 2526. FIG. 25 shows a configuration in which tone signal communication section 2510 and data signal communication section 2520 share carrier signal source 2502.

A configuration with separate carrier signal sources can also be used, both when signals with different center frequencies are used for a tone signal and a data signal, and when signals with the same center frequency are used. In Embodiment 1, such a configuration is implemented when data signal communication section 2520 and a carrier signal source are used in broadband communication section 101, and tone signal communication section 2510 and a separate carrier signal source are used in narrowband communication section 102. Even if there is a single carrier signal source, different center frequencies can be used for tone signal communication section 2510 and data signal communication section 2520 by changing the frequency from the carrier signal source 2502 frequency using a mixer or suchlike frequency converting element. With regard to the antenna, also, a configuration may be used in which a plurality of antennas are divided between tone signal use and data signal use according to the signal band.

Although it is preferable to use a narrowband signal as a tone signal and to use a broadband signal as a data signal in this embodiment, the present invention is not limited to this, and it is possible to set tone signal and data signal bands without regard to relative band size.

It also goes without saying that the present invention also includes a configuration in which a narrowband communication section and broadband communication section of Embodiments 1 through 5 are replaced by tone signal communication section 2510, data signal communication section 2520, and carrier signal source 2502 of this embodiment.

The operation of signal communication section 2500 of a radio communication apparatus of Embodiment 6 will now be described.

First, the operation of tone signal communication section 2510 will be described. When transmitting, tone signal control section 2519 generates a tone signal based on a unique data pattern held in tone signal control section 2519 in accordance with a tone signal control signal input from MAC control section 103, and outputs this signal to frequency converter 2518.

Then frequency converter 2518 performs frequency conversion of the tone signal input from tone signal control section 2519—that is, converts it to a signal with the carrier output from carrier signal source 2502 as the center frequency—and outputs the frequency-converted signal to transmit/receive switch 2514.

Next, transmit/receive switch 2514 outputs the post-frequency-conversion tone signal input from frequency converter 2518 to filter 2512.

Then filter 2512 band-limits the tone signal input from transmit/receive switch 2514 to a predetermined frequency, and outputs the band-limited tone signal to distributor 2530.

On the other hand, when receiving, filter 2512 band-limits a tone signal input from distributor 2530 to a predetermined frequency, and outputs the band-limited tone signal to transmit/receive switch 2514.

Transmit/receive switch 2514 outputs the tone signal input from filter 2512 to frequency converter 2516. Frequency converter 2516 performs frequency conversion of a tone signal input from transmit/receive switch 2514. That is to say, frequency converter 2516 converts the tone signal to a baseband signal based on a carrier output from carrier signal source 2502, and outputs the converted signal to tone signal control section 2519.

Tone signal control section 2519 has the tone signal input from frequency converter 2516 as input, determines the type of tone signal according to the length of the tone signal, generates a corresponding tone signal control signal, and outputs the generated tone signal control signal to MAC control section 103.

Next, the operation of data signal communication section 2520 will be described.

When data signal communication section 2520 is transmitting, data communication control section 2529 outputs a data signal input from MAC control section 103 to modulator 2528.

Modulator 2528 modulates a data signal input from data communication control section 2529—that is, converts it to a signal with the carrier output from carrier signal source 2502 as the center frequency—and outputs the modulated data signal to transmit/receive switch 2524.

Next, transmit/receive switch 2524 outputs the post-modulation data signal input from modulator 2528 to filter 2522. Then filter 2522 band-limits the data signal input from transmit/receive switch 2524 to a predetermined frequency, and outputs the band-limited data signal to distributor 2530.

On the other hand, when receiving, filter 2522 band-limits a data signal input from distributor 2530 to a predetermined frequency, and outputs the band-limited data signal to transmit/receive switch 2524.

Transmit/receive switch 2524 outputs the data signal input from filter 2522 to demodulator 2526. Demodulator 2526 performs demodulation of a data signal input from transmit/receive switch 2524. That is to say, demodulator 2526 converts the data signal to a baseband signal based on a carrier output from carrier signal source 2502, and outputs the converted signal to data communication control section 2529.

Data communication control section 2529 outputs the data signal input from demodulator 2526 to MAC control section 103.

Thus, in this embodiment, a configuration is employed in which tone signal communication section 2510 and data signal communication section 2520 share carrier signal source 2502, enabling a low-cost radio communication apparatus with a small number of parts to be provided.

Embodiment 7

The configuration and operation of a radio communication apparatus according to Embodiment 7 will now be described.

FIG. 25 of Embodiment 6 shows an example in which tone signal communication section 2510 and data signal communication section 2520 are provided as two transmission systems in order to transmit a broadband signal and a tone signal simultaneously. However, if simultaneous transmission is not performed, a single transmission system is sufficient, and therefore a radio communication apparatus with such a configuration is presented here as Embodiment 7, and its configuration and operation are described below.

Figure 26:
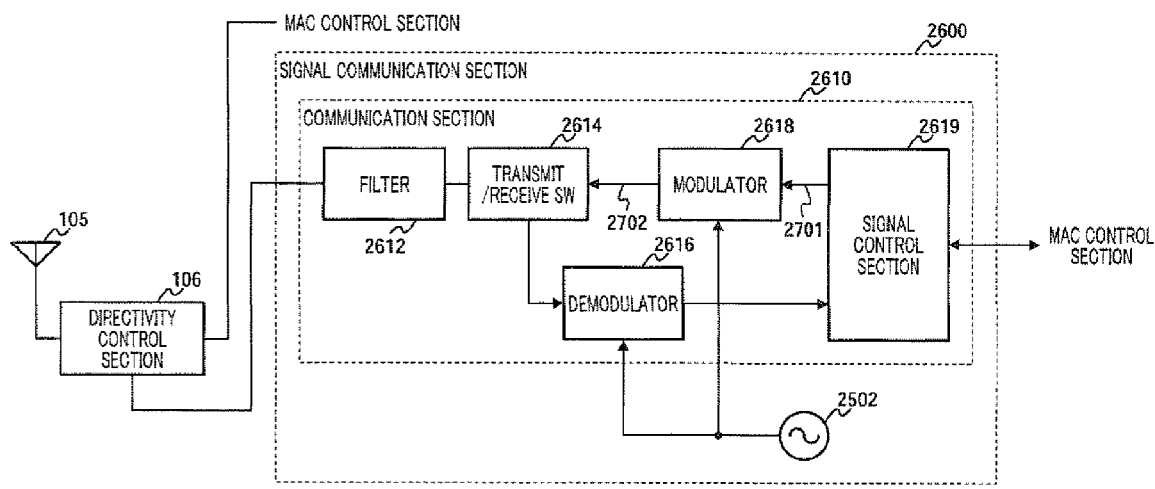
FIG. 26 is a block diagram showing the configuration of a signal communication section according to Embodiment 7 of the present invention.

The configuration of Embodiment 7 will now be described with reference to FIG. 26. FIG. 26 is a block diagram showing the configuration of a signal communication section 2600 of a radio communication apparatus according to this embodiment.

The configuration and operation of this embodiment corresponding to MAC control section 103 and other parts than broadband communication section 101 and narrowband communication section 102 in Embodiment 1 are identical to those of Embodiment 1, and therefore a description thereof is omitted here.

Signal communication section 2600 is composed of a communication section 2610 and a carrier signal source 2502. Communication section 2610 is equipped with a filter 2612, a transmit/receive switch 2614, a demodulator 2616, a modulator 2618, and a signal control section 2619.

When transmitting a tone signal, communication section 2610 generates a tone signal from a tone signal control signal input from MAC control section 103, and outputs this tone signal to modulator 2618. When receiving a tone signal, communication section 2610 has a tone signal input from demodulator 2616 as input, determines the type of tone signal according to the length of the tone signal, generates a corresponding tone signal control signal, and outputs this signal to MAC control section 103.

When transmitting a data signal, communication section 2610 modulates a data signal input from MAC control section 103 and outputs the modulated signal to directivity control section 106. When receiving a data signal, communication section 2610 demodulates a data signal input from directivity control section 106, and outputs the demodulated signal to MAC control section 103.

When transmitting, filter 2612 band-limits a tone signal or data signal input from transmit/receive switch 2614 to a predetermined frequency, and outputs the signal to directivity control section 106. When receiving, filter 2612 band-limits a tone signal or data signal input from directivity control section 106 to a predetermined frequency, and outputs the signal to transmit/receive switch 2614.

Transmit/receive switch 2614 performs signal connection and direction switching between transmission and reception so that, when transmitting, a post-frequency-conversion or post-modulation tone signal or data signal input from modulator 2618 is output to filter 2612, and when receiving, a tone signal or data signal input from filter 2612 is output to demodulator 2616.

Demodulator 2616 performs frequency conversion or demodulation of a tone signal or data signal input from transmit/receive switch 2614. That is to say, demodulator 2616 converts a tone signal or data signal to a baseband signal based on a carrier output from carrier signal source 2502, and outputs the converted signal to signal control section 2619.

When transmitting, modulator 2618 performs frequency conversion or modulation of a tone signal or data signal input from signal control section 2619—that is, converts it to a signal with the carrier output from carrier signal source 2502 as the center frequency—and outputs the resulting signal to transmit/receive switch 2614.

When transmitting a tone signal, signal control section 2619 outputs a tone signal to modulator 2618 based on a unique data pattern held in signal control section 2619 in accordance with a tone signal control signal input from MAC control section 103. When transmitting data, signal control section 2619 outputs a data signal input from MAC control section 103 to modulator 2618.

When receiving a tone signal, signal control section 2619 has a tone signal input from demodulator 2616 as input, determines the type of tone signal according to the length of the tone signal, generates a corresponding tone signal control signal, and outputs this signal to MAC control section 103. When receiving a data signal, signal control section 2619 has a data signal input from demodulator 2616 as input, and outputs this signal to MAC control section 103.

The operation of a radio communication apparatus according to Embodiment 7 will now be described.

When transmitting a tone signal, signal control section 2619 outputs a tone signal to modulator 2618 based on a unique data pattern held in signal control section 2619 in accordance with a tone signal control signal input from MAC control section 103. When transmitting a data signal, signal control section 2619 outputs a data signal input from MAC control section 103 to modulator 2618.

Then modulator 2618 performs frequency conversion or modulation of a tone signal or data signal input from signal control section 2619—that is, converts it to a signal with the carrier output from carrier signal source 2502 as the center frequency—and outputs a modulator output signal 2702 to transmit/receive switch 2614.

Next, transmit/receive switch 2614 outputs a post-frequency-conversion or post-modulation tone signal or data signal (modulator output signal 2702) input from modulator 2618 to filter 2612. Filter 2612 band-limits the tone signal or data signal input from transmit/receive switch 2614 to a predetermined frequency, and outputs the band-limited signal to directivity control section 106.

On the other hand, when receiving, filter 2612 band-limits a tone signal or data signal input from directivity control section 106 to a predetermined frequency, and outputs the band-limited signal to transmit/receive switch 2614.

Transmit/receive switch 2614 outputs the tone signal or data signal input from filter 2612 to demodulator 2616. Demodulator 2616 performs frequency conversion or demodulation of a tone signal or data signal input from transmit/receive switch 2614. That is to say, demodulator 2616 converts the tone signal or data signal to a baseband signal based on a carrier output from carrier signal source 2502, and outputs the converted signal to signal control section 2619.

When receiving a tone signal, signal control section 2619 has a tone signal input from demodulator 2616 as input, determines the type of tone signal according to the length of the tone signal, generates a corresponding tone signal control signal, and outputs this signal to MAC control section 103. When receiving a data signal, signal control section 2619 outputs a data signal input from demodulator 2616 to MAC control section 103.

Figure 27:
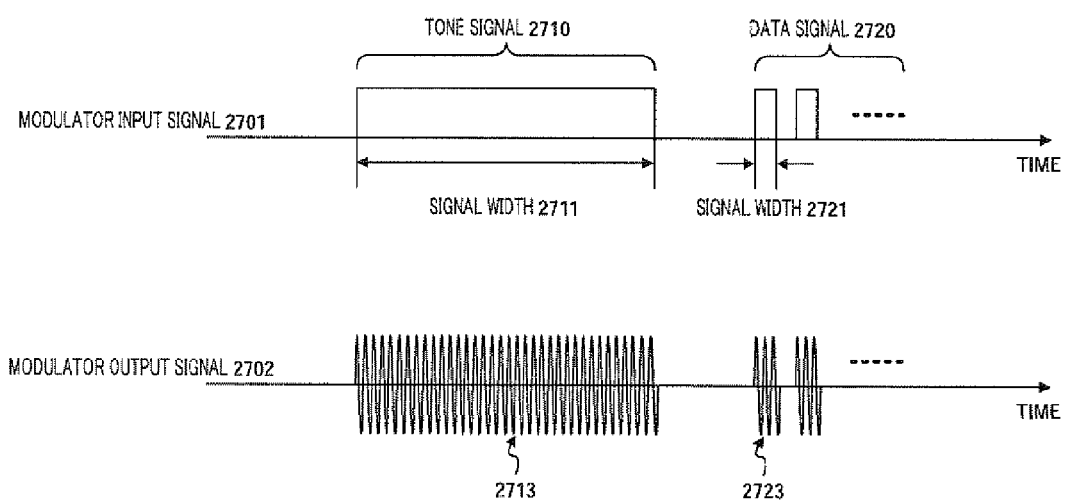
FIG. 27 is a timing chart showing signal waveforms of a signal communication section according to Embodiment 7 of the present invention.

FIG. 27 shows an example of the signal waveform of modulator output signal 2702 after an input modulator input signal 2701 has undergone modulation or frequency conversion by modulator 2618 in this case. In the signals input to modulator 2618, signal width 2711 of a tone signal 2710 and signal width 2721 of a data signal 2720 differ, and a modulator output signal containing a sine wave component also differs in width according to this signal width. It goes without saying that a signal with a wide width is a narrowband signal, and a signal with a narrow width is a broadband signal. Examples of signal widths are 1 microseconds for tone signal 2710 and 1 nanoseconds for data signal 2720, but the signal widths are not limited to these, and will vary greatly depending on the application system. Also, a tone signal need not necessarily be a narrowband signal, and tone signal width 2711 may be equal to or smaller than data signal width 2721.

Also, with regard to the method of separating a tone signal and data signal when receiving, if a tone signal and data signal are of different frequencies, for example, it is possible to separate the two by filter band. Similarly, if tone signal and data signal are not transmitted simultaneously, it is possible to separate them temporally. Furthermore, if they are transmitted at the same frequency and the same time, it is possible to separate them by changing the transmit signal power. In this case, separation can be performed by means of a demodulator 2616 received power threshold value by, for example, making the amplitude smaller and making the transmission power smaller for a tone signal having a long signal time, and making the amplitude larger and making the transmission power larger for a data signal.

Thus, in this embodiment, a configuration is employed in which a tone signal and a data signal are processed by a single signal communication section, as a result of which the configuration is simple and the number of parts small, and a low-cost, low-power-consumption radio communication apparatus can be provided.

A radio communication method of the present invention is a radio communication method whereby a plurality of radio communication apparatuses communicate with each other in an ad hoc network, and has a step of transmitting an end tone for identifying the end of a super-frame from one radio communication apparatus, and a step of synchronizing at another radio communication apparatus, the end of its own super-frame when having received that end tone.

By this means, a radio communication apparatus performs synchronization with a super-frame by using a low-power-consumption tone signal, without using a beacon provided by a modulated signal, enabling power consumption to be reduced as compared with a conventional method.

Also, a radio communication method of the present invention further has a step of transmitting a send/receive tone for giving notification of data transmission from the one radio communication apparatus while performing carrier sense after the elapse of a predetermined time from the end of a super-frame, and a step of transmitting a data signal after completion of transmission of that send/receive tone.

By this means, a radio communication apparatus can detect the start of data reception by monitoring only a tone signal, making it possible to keep standby power consumption low.

Also, a radio communication method of the present invention further has a step of enabling reception of the data signal and receiving a data signal at the one radio communication apparatus after receiving a send/receive tone from another radio communication apparatus, and a step of transmitting the send/receive tone from the one radio communication apparatus while performing carrier sense when having received that data signal normally.

By this means, a radio communication apparatus need not wait for reception of a wideband data signal, enabling standby power consumption to be reduced.

Also, in a radio communication method of the present invention, the step of transmitting an end tone is a step of transmitting a narrowband signal end tone for identifying the end of a super-frame from the one radio communication apparatus.

By this means, a radio communication apparatus performs synchronization with a super-frame by using a low-power-consumption, narrowband tone signal, without using a beacon provided by a modulated signal, enabling power consumption to be reduced as compared with a conventional method.

Also, a radio communication method of the present invention further has a step of transmitting a narrowband signal send/receive tone from the one radio communication apparatus while performing carrier sense after the elapse of a predetermined time from the end of a super-frame, and a step of transmitting a broadband data signal from the one radio communication apparatus after completion of transmission of the send/receive tone.

By this means, a radio communication apparatus can detect the start of data reception by monitoring only a narrowband signal, thereby making it possible to keep standby power consumption low.

Also, a radio communication method of the present invention further has a step of enabling reception of a broadband signal and receiving the data signal at the one radio communication apparatus after receiving a send/receive tone from another radio communication apparatus, and a step of transmitting the narrowband send/receive tone from the one radio communication apparatus while performing carrier sense when having received the data signal normally.

By this means, a radio communication apparatus need not wait for reception of a wideband data signal, enabling standby power consumption to be reduced.

In a radio communication method of the present invention, an end tone is transmitted in an end tone slot set before and after the end of a super-frame, and the one radio communication apparatus re-sets the end of a super-frame based on the end tone received first in an end tone slot.

By this means, it is possible for each radio communication apparatus of a super-frame group to synchronize with the earliest end tone in a super-frame.

Also, a radio communication method of the present invention has a step of, when an end tone received from another radio communication apparatus is the first in an end tone slot, and reception is completed before the start of transmission of the end tone of the one radio communication apparatus, re-setting the end of a super-frame at that time of completion, at the one radio communication apparatus, and a step of transmitting from the one radio communication apparatus, its own end tone at the timing at which an end tone is received.

By this means, the time difference between an end tone received first and the apparatus's own end tone can be kept smaller, making it possible to synchronize with the same super-frame in a short time overall.

Also, a radio communication method of the present invention has a step of, when there is a mixed plurality of super-frame groups that are groups of radio communication apparatuses sharing a super-frame, a radio communication apparatus of a first super-frame group notifying another radio communication apparatus of its own super-frame group of synchronizing with a second super-frame, and that radio communication apparatus of the first super-frame group waits for reception of an end tone from a second super-frame group across super-frames as a whole, and re-sets the end of the super-frame based on that received end tone.

By this means, it is possible for a radio communication apparatus to start transmission/reception even if it encounters another super-frame group in a mobile environment.

Also, in a radio communication method of the present invention, a radio communication apparatus belonging to a first super-frame group notifies another radio communication apparatus of synchronizing with a super-frame of a second super-frame group by transmitting an end tone again in an end tone slot after transmitting an end tone giving notification of the current end, and another radio communication apparatus belonging to the first super-frame group that receives that end tone giving notification of that synchronizing transmits an end tone again in an end tone slot after transmitting an end tone giving notification of the current end.

By this means, a radio communication apparatus executes re-synchronization in super-frame group units, and all communications are possible since group convergence occurs without any fear of current communication being disrupted.

Also, a radio communication method of the present invention provides at a narrowband tone signal, a beginning tone 1 and beginning tone 2 defined by changing duration, and has a step of transmitting a narrowband signal beginning tone 1 for communication collision avoidance from a radio communication apparatus while performing carrier sense, a step of transmitting a narrowband signal beginning tone 2 from a radio communication apparatus that receives that beginning tone 1, and a step of stopping at a radio communication apparatus that receives that beginning tone 1 or beginning tone 2, transmitting a narrowband signal beginning tone 1 from the apparatus in the current super-frame.

By this means, when a plurality of responses are made in multicast communication or the like, each radio communication apparatus suppresses transmission so that responses are made one at a time.

Also, a radio communication method of the present invention has a step of transmitting from a radio communication apparatus that transmits beginning tone 1, a probe request inquiring about attributes and/or communication environment by means of a broadband signal to a radio communication apparatus that receives beginning tone 2, and a step of transmitting from a radio communication apparatus that receives that probe request, a probe response containing information on its own attributes and communication environment by means of a broadband signal.

By this means, a plurality of geographical reuses are possible for a radio communication apparatus in the same time period by causing probe requests to be performed by means of multicasting using a beginning tone.

A radio communication method of the present invention has a step of transmitting a send/receive tone from a radio communication apparatus that receives a probe request before transmitting a probe response, a step of transferring a received send/receive tone from a radio communication apparatus that transmits a probe request when having received that send/receive tone, and a step of stopping at a radio communication apparatus that is not transmitting a probe request, the start of transmission of a probe response from the apparatus when having received a send/receive tone.

By this means, contention between a requesting side radio communication apparatus and a responding side radio communication apparatus at a nearby location can be kept to a minimum.

Also, a radio communication method of the present invention has a step of counting by means of back-off a predetermined time until probe response reception is completed, at a radio communication apparatus that transmits a probe request, and a step of transmitting a probe request period end notification to a neighboring radio communication apparatus from a radio communication apparatus that transmits a probe request when having finished counting the predetermined time.

By this means, a radio communication apparatus can terminate a probe in the minimum necessary time.

Also, in a radio communication method of the present invention, in a probe request a radio communication apparatus that transmits a probe request configures a plurality of sectors by means of a plurality of directional antennas, and when radio communication apparatuses in each sector are in a state in which mutual transmission/reception is possible, send/receive tone transmission performed by a radio communication apparatus that transmits a probe request is performed in order on a sector-by-sector basis by each directional antenna.

By this means, it is possible for probe processing of a fixed radio communication apparatus to execute a probe operation efficiently by deciding on a sector.

Also, a radio communication method of the present invention has a step of counting by means of back-off a predetermined time until probe response reception is completed, at a radio communication apparatus that transmits a probe request, and a step of transmitting a probe request period end notification to a neighboring radio communication apparatus from a radio communication apparatus that transmits a probe request when having finished a count of the predetermined time in all sectors.

By this means, a radio communication apparatus can make the sector wait time the minimum necessary.

Also, in a radio communication method of the present invention, when having received a send/receive tone following an end tone in an end tone slot, the one radio communication apparatus acquires a control frame containing data transmission/reception reservation information transmitted by a neighboring radio communication apparatus in the super-frame after the end of that end tone slot, and transmits a probe response containing its own attribute and communication environment information and/or information on a time period reserved by a control frame in a time period not reserved by a control frame of the next super-frame.

By this means, a radio communication apparatus can perform time reservation of all sections of a data period by performing communication using RTS/CTS-e, enabling the entirety of a super-frame to be utilized more effectively than with a conventional scheme.

Also, the durations of narrowband signals (tone signals) used in a radio communication method of the present invention increase in send/receive tone, beginning tone 1, beginning tone 2, and end tone order, and an end tone is at least twice as long as beginning tone 2.

By this means, while a send/receive tone of a radio communication apparatus must be as short as possible due to its relation to throughput, an end tone can still be detected as an end tone even if tripled. Also, if two or more beginning tones 1 are emitted in the same period, they will be regarded as beginning tones 2.

Also, a radio communication method of the present invention is a radio communication method of one radio communication apparatus whereby a plurality of radio communication apparatuses communicate with each other in an ad hoc network, and has a step of measuring elapsed time in a super-frame and transmitting an end tone for identifying the end, a step of transmitting a send/receive tone for giving notification of data transmission after the elapse of a predetermined time based on an end time re-set based on the end tone transmitted first, and a step of transmitting a data signal after completion of transmission of that send/receive tone.

Also, in a radio communication method of the present invention, the end tone and send/receive tone are narrowband signals, and the data signal is a broadband signal data signal.

Also, a radio communication method of the present invention has a step of transmitting a narrowband signal beginning tone 1 for communication collision avoidance from the one radio communication apparatus while performing carrier sense, and a step of receiving a beginning tone 2 transmitted by another radio communication apparatus that receives the beginning tone 1, at the one radio communication apparatus.

Also, a radio communication method of the present invention has a step of transmitting from one radio communication apparatus that transmits the beginning tone 1, a probe request inquiring about attributes and/or communication environment by means of a broadband signal to the other radio communication apparatus that transmits beginning tone 2, and a step of receiving a probe response containing information on its own attributes and/or communication environment by means of a broadband signal from the other radio communication apparatus that receives the probe request.

Also, a radio communication apparatus of the present invention has a tone signal communication section that transmits and receives tone signals, a data signal communication section that performs modulation and transmits and receives data by means of a broadband signal, a time management section, and a frame transmitting/receiving section. This time management section measures elapsed time in a super-frame, transmits an end tone for identifying the end from the tone signal communication section, or receives an end tone via the tone signal communication section, and re-sets the end time based on the end tone received first before the super-frame end time. The frame transmitting/receiving section transmits a send/receive tone for giving notification of data transmission from the tone signal communication section after the elapse of a predetermined time based on the end time re-set by the time management section, and after transmission of that send/receive tone is completed, transmits data via the data signal communication section, or sets the data signal communication section to a receivable state when a send/receive tone is received, and receives data from the data signal communication section.

By means of this configuration, a radio communication apparatus can implement super-frame synchronization between super-frame groups without using a beacon.

Also, in a radio communication apparatus of the present invention, the tone signal communication section is a narrowband communication section that transmits and receives narrowband tone signals, and the data signal communication section is a broadband communication section that performs modulation and transmits and receives data by means of a broadband signal.

By means of this configuration, a radio communication apparatus can implement super-frame synchronization between super-frame groups without using a beacon.

A radio communication apparatus of the present invention also has a re-synchronization control section. This re-synchronization control section gives notification of synchronizing with a super-frame of another group that does not share a super-frame to another radio communication apparatus belonging to the same group as the radio communication apparatus that shares a super-frame. Then an end tone of another group is monitored in all super-frame periods, and when that end tone is received, the super-frame end is re-set to, and an end tone is transmitted via the narrowband communication section.

By this means, it is possible for a radio communication apparatus to perform synchronization with a super-frame of another super-frame group.

A radio communication apparatus of the present invention also has a probe transmitting section that gives a directive for beginning tone 1 transmission to a beginning tone control section, and upon subsequent notification of reception of beginning tone 2 from that beginning tone control section, gives a directive to the frame transmitting/receiving section for transmission of a probe request frame requesting notification of attribute and communication environment information to another radio communication apparatus, and a probe receiving section that, when having received the probe request, directs the frame transmitting/receiving section to transmit its own attribute and/or communication environment information.

By means of this configuration, a radio communication apparatus can implement by means of a probe confirmation of the existence of a node that has been implemented by a beacon.

Embodiment 8

With this embodiment, the configuration of MAC will be explained whereby transmission and reception without mutual interference are performed by synchronization between radio communication apparatuses (i.e. nodes) that utilize a radio communication scheme of different modulation schemes using an end tone.

For example, when there are apparatus groups that transmit and receive modulation signals modulated by two modulation schemes of ASK and PSK in a certain frequency band, assume that the ASK apparatus group is group A and the PSK modulation group is group B.

Figure 28:
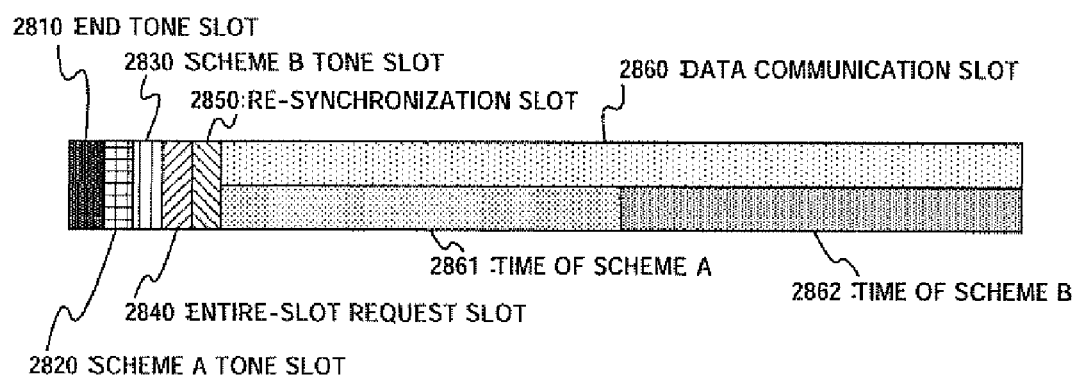
FIG. 28 is a drawing showing the configuration of a super-frame according to Embodiment 8 of the present invention.

FIG. 28 is a diagram showing the configuration of a super-frame according to this embodiment.

Group A and Group B mutually transmit an end tone for transmission of their carriers in non-modulation, reaching one super-frame synchronization. An end tone is transmitted in end tone slot 2810 in the same way as the above-described Embodiments. However, with this embodiment, end tone slot 2810 does not use a re-synchronization tone signal and probe tone signal formed utilizing the length and intermittency as in Embodiment 1, and uses an end tone alone. However, there continues to exist a re-synchronization tone signal in another slot as described later. After that, group A and group B transmit their active tones in scheme A tone slot 2820 and scheme B tone slot 2830, respectively. Similar to the prior art, as a signal, an active tone is a modulation or non-modulation signal. This embodiment assumes that all tones share the same length. Tone signals received in each-scheme tone slot 2820 and 2830 make vicinities recognize an existence of radio communication apparatuses belonging to those groups.

If there is no radio communication apparatus in vicinities using a different radio communication scheme from that of an apparatus, all slots in data communication slot 2860 may be used for data communication.

By contrast with this, if there is a radio communication apparatus in the vicinities using a different radio communication scheme from that of an apparatus, data communication is limited to communication in sub-super-frames 2861 and 2862 dividing data communication slot 2860 per scheme. In the example of FIG. 28, sub-super-frame 2861 represents the time of scheme A and sub-super-frame 2862 represents the time of scheme B.

Entire-slot request slot 2840 allows data communication slot 2860 to be used in one modulation scheme (e.g. group A). When receiving a tone signal in entire-slot request slot 2840, a radio communication apparatus of group B stops communication other than tone transmission even if it is synchronized with a radio communication apparatus of group A.

Entire-slot request slot 2840 is requested by a radio communication apparatus of group A that would not reduce a super-frame by half in stream transmission or the like.

This embodiment uses only one entire-slot request slot 2840, but it is also possible to set more request slots. That is, an embodiment is possible for setting a slot showing what percent of data communication slot 2860 is requested (e.g. a slot request for zero, twenty, forty, sixty, eighty or hundred percent of data communication slot 2860). In this case, the positions of slots to be deleted (or added) need to be assigned in advance, such that the slot for transmitting a control frame in the communication slot of each scheme is secured and fixed in the time domain.

Re-synchronization slot 2850 is a tone slot for searching for other super-frame groups and is transmitted by a node of group A or group B if necessary. As in Embodiment 1, a re-synchronization tone is conveyed in a bucket-brigade to enable all super-frame groups to enter in a re-synchronization state.

A tone signal of group A and a tone signal of group B are not limited to be transmitted in ASK or PSK. Further, a tone signal is not limited to a signal with a widened DS-UWB pulse width.

A general protocol such as TDMA protocol and CSMA protocol is developed in the sub-super-frame in the time of each scheme (e.g. sub-super-frame 2861 in scheme A time and sub-super-frame 2862 in scheme B time) in data communication slot 2860.

According to this embodiment, it is of course possible to provide an autonomous-distributed beacon period scheme such as WiMedia MAC. IEEE802.15 MAC is also possible whereby AP (Access Point) and PNC (Piconet Coordinator) transmit a beacon to accept a reservation of the slot in the time of each scheme. However, this embodiment is unique only in using only the slot in the time of a scheme.

Since tones are transmitted in the same frequency band, to decide an end tone, a tone signal that arrives at end tone slot 2810 first is regarded as an end tone if end tone slot synchronization is established. Since an end tone is transmitted in a combination of scheme tone slots 2820 and 2830 if synchronization with end tone slot 2810 is not established, a tone signal of this combination pattern is regarded as an end tone. Therefore, to find an end tone in the re-synchronization state, end tone transmission is not performed at the time the end tone is found, and end tone synchronization is performed from the next end tone slot.

By this means, it is possible to dynamically change slots in each communication scheme and perform communication while checking whether or not there are participants.

Since communication is performed between more than two parties, there is a possibility that conditions occur where one is able to use the entirety of a slot and the other is able to use division of the slot. By this means, the two communicating parties report to each other how the active slots of scheme A and scheme B look in the frames for their beacons or their communication requests, so as to give consideration on the communication slot of the party that uses division of the slot. For example, a TDMA protocol requires ingenuities to report the time for random access requesting an assignment of a slot in the super-frame of the party's original scheme and uses expanded slots verified between communicating parties, and a CSMA protocol requires ingenuities not to use the time of the scheme of the other party as a scheme group.

This embodiment has been explained with assumption of two different radio communication schemes (i.e. ASK and PSK), but kinds of radio communication schemes are not limited to two kinds. If three or more kinds of schemes coexist, there are various reuse methods for the sub-super-frame of each scheme that is not present in the vicinity. For example, a method is possible whereby, if all schemes are always ordered by the time-occupation priority, according to this order, the scheme of the highest priority order between schemes that are present in the vicinity occupy the entirety of the sub-super-frame of a scheme that is not present in the vicinity (reuse method 1). Further, in a case of a scheme group that emphasizes the continuity of sub-super-frames, a scheme that is not present in the vicinity of sub-super-frames of schemes that are equally divided may be used by the scheme preceding in time between schemes that are present in the vicinity (reuse method 2). The "sub-super-frame" represents the essential occupation communication time in each scheme.

FIG. 29 is a diagram showing the configuration of a super-frame in which three schemes coexist according to this embodiment. A super-frame is comprised of various slots, and data communication slot 2860 is comprised of sub-super-frames of scheme A through scheme C. In this example, there is scheme C in addition to above-described scheme A and scheme B, as kinds of radio communication schemes. An apparatus group of scheme C transmits an active tone in scheme C tone slot 2835 after scheme B tone slot 2830.

In this example, as shown in FIG. 29A, data communication slot 2860 is divided into three in units of schemes, in order of sub-super-frame 2861 in the time of scheme A, sub-super-frame 2862 in the time of scheme B and sub-super-frame 2863 in the time of scheme C.

With this configuration, as shown in FIG. 29B, if scheme C is not present, sub-super-frame 2863*a* in the time of scheme C is used for the time of scheme A that has the highest priority order in existent schemes when the priority order is A>B>C (reuse method 1), or sub-super-frame 2863*a* in the time of scheme C is used for the time of scheme B preceding in time if the continuity of sub-super-frames is emphasized (reuse method 2).

Further, as shown in FIG. 29C, if scheme B is not present, sub-super-frame 2862*a* of scheme B time is used for scheme A time that has the highest priority order in existent schemes when the priority order is A>B>C (reuse method 1), or sub-super-frame 2862*a* of scheme B time is used for scheme A time which is previous in the time domain if the continuity of sub-super-frames is emphasized (reuse method 2).

Further, as shown in FIG. 29D, if scheme A is not present, sub-super-frame 2861*a* of scheme A time is used for scheme B time that has the highest priority order in existent schemes when the priority order is A>B>C (reuse method 1), or sub-super-frame 2861*a* of scheme A time is used for scheme C time preceding in time if the continuity of sub-super-frames is emphasized (reuse method 2).

Also, with this embodiment, scheme tone slots 2820 and 2830, entire slot request slot 2840 and re-synchronization slot 2850 are defined as slots following end tone slot 2810, but the order of slots after end tone slot 2810 needs not be the same as in this embodiment.

The disclosures of Japanese Patent Application No. 2007-027409, filed on Feb. 6, 2007, and Japanese Patent Application No. 2008-022067, filed on Jan. 31, 2008, including the specifications, drawings and abstracts, are incorporated herein by reference in their entirety.

INDUSTRIAL APPLICABILITY

The present invention is useful for a radio communication method and radio communication apparatus in an ad hoc network, and is particularly suitable for file exchange between radio communication apparatuses in a mobility environment.

The invention claimed is:

1. A radio communication method of finding synchronization between radio communication apparatus groups using different radio communication schemes from each other while performing ad hoc network communication between radio communication apparatuses using a same radio communication scheme, the method comprising:
in the radio communication apparatus groups, finding synchronization by employing an end tone to identify an end of a super-frame;
in radio communication apparatuses that belong to the radio communication apparatus groups, transmitting a tone signal to report an existence of the radio communication apparatus groups, wherein the tone signal is transmitted in an existence confirmation slot per radio communication scheme provided in the super-frame, and used to determine a slot that is assigned to the radio communication apparatus groups that use the radio communication schemes in the super-frame;
deciding, employing the tone signal, whether there is at least one radio communication apparatus that uses a different modulation scheme from a modulation scheme used by one of the radio communication apparatus groups, in the vicinity of the one radio communication apparatus group;
selecting a slot time in which there is no radio communication apparatus that uses the different modulation scheme when there is the at least one radio communication apparatus that uses the different modulation scheme in the vicinity; and
reporting another slot time as a time that can be used by a radio communication group that uses the different modulation scheme by employing the tone signal, and thereby performing radio communication in the selected time slot.

2. The communication method according to claim 1, wherein:
the super-frame further comprises an entire-slot mandatory use slot that requests a use of an entire slot; and
when the tone signal is received in the entire-slot mandatory use slot, an entire super-frame time is assigned to a radio communication apparatus group of one of the radio communication schemes.

3. The communication method according to claim 1, wherein:
the super-frame further comprises a slot use proportion slot indicating a percent of slot which is requested; and
when the tone signal is received in the slot use proportion slot, a super-frame time is assigned according to a proportion of the tone signal requested with a highest proportion.

4. A radio communication apparatus in a radio communication apparatus group that finds synchronization with another radio communication apparatus group, the radio communication apparatus groups using different radio communication schemes from each other, while performing ad hoc network communication with another radio communication apparatus using a same radio communication scheme, the apparatus comprising:

a synchronizing section that finds synchronization by employing an end tone to identify an end of a super-frame; and a tone signal transmitting section that transmits a tone signal to report an existence of a radio communication apparatus group to which the radio communication apparatus belongs, wherein the tone signal is transmitted in the super-frame per radio communication scheme provided in an existence confirmation slot, and used to determine a slot that is assigned to the radio communication apparatus groups that use the radio communication schemes in the super-frame, and wherein the radio communication apparatus is configured to:

decide whether there is at least one other radio communication apparatus that uses a different modulation scheme from a modulation scheme used by one of the radio communication apparatus groups, in the vicinity of the one radio communication apparatus group, employing the tone signal;

select a slot time in which there is no radio communication apparatus that uses the different modulation scheme when there is the at least one radio communication apparatus that uses the different modulation scheme in the vicinity; and report another slot time as a time that can be used by a radio communication group that uses the different modulation scheme by employing the tone signal, and thereby performing radio communication in the selected time slot.

5. The radio communication method according to claim 1, wherein in the finding of the synchronization by employing the end tone, the radio communication apparatus group synchronize with a super-frame of a radio communication apparatus that transmits an earliest end tone.

6. The radio communication apparatus according to claim 4, wherein the synchronization section synchronizes with a super-frame of a radio communication apparatus that transmits an earliest end tone.

* * * * *